United States Patent
Kika

(10) Patent No.: US 6,919,687 B2
(45) Date of Patent: Jul. 19, 2005

(54) HIGH-VOLTAGE DISCHARGE LAMP LIGHTING APPARATUS, HIGH-VOLTAGE DISCHARGE LAMP APPARATUS, AND FLOODLIGHT PROJECTOR APPARATUS

(75) Inventor: Manabu Kika, Kanagawa (JP)

(73) Assignee: Harison Toshiba Lighting Corporation, Imabari (JP)

( * ) Notice: Subject to any disclaimer, the term of this patent is extended or adjusted under 35 U.S.C. 154(b) by 0 days.

(21) Appl. No.: 10/772,282

(22) Filed: Feb. 6, 2004

(65) Prior Publication Data

US 2004/0155594 A1 Aug. 12, 2004

Related U.S. Application Data

(63) Continuation of application No. PCT/JP02/08613, filed on Aug. 27, 2002.

(30) Foreign Application Priority Data

Aug. 31, 2001 (JP) ........................................ 2001-264812

(51) Int. Cl.⁷ ............................................... H01J 13/46
(52) U.S. Cl. .......................................... 315/57; 315/70
(58) Field of Search ............................ 315/56–57, 70, 315/246, 276, 283, 291, 326; 331/182, 184

(56) References Cited

U.S. PATENT DOCUMENTS 4,392,081 A * 7/1983 Brown et al. .................. 315/46
5,550,452 A * 8/1996 Shirai et al. .................... 320/2
5,959,410 A * 9/1999 Yamauchi et al. ......... 315/209 R
6,392,364 B1 * 5/2002 Yamamoto et al. ......... 315/291

FOREIGN PATENT DOCUMENTS

| JP | 02-288193 | 11/1990 |
| JP | 2001-102189 | 4/2001 |

* cited by examiner

Primary Examiner—Thuy V. Tran
(74) Attorney, Agent, or Firm—Oblon, Spivak, McClelland, Maier & Neustadt, P.C.

(57) ABSTRACT

A high-voltage discharge lamp lighting apparatus has a stabilizer which supplies a power voltage used for maintaining the lighting operation to a high-voltage discharge lamp, and an ignitor circuit having an oscillating circuit-for-driving in which a start pulse generates upon starting the lighting operation of the high-voltage discharge lamp, and high-voltage pulse generating transformers which increase a voltage of the start pulse. Further, the high-voltage discharge lamp lighting apparatus includes a cap portion to which the high-voltage discharge lamp is attached and held, including a part of the high-voltage pulse generating transformers of the ignitor circuit, and a socket portion to which the cap portion is attached and is fit, including at least the oscillating circuit-for-driving in the ignitor circuit and a portion of the high-voltage pulse generating transformers except for a part included in the cap portion.

18 Claims, 9 Drawing Sheets

FIG.7A     FIG.7B     FIG.7C
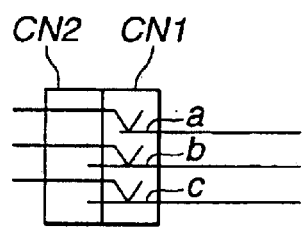
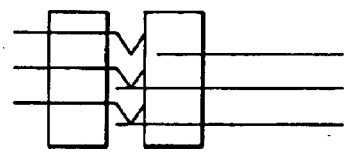
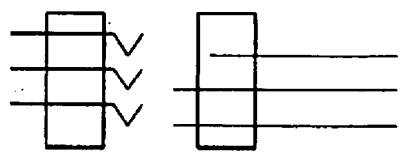
FIG.8

HIGH-VOLTAGE DISCHARGE LAMP LIGHTING APPARATUS, HIGH-VOLTAGE DISCHARGE LAMP APPARATUS, AND FLOODLIGHT PROJECTOR APPARATUS

This application claims benefit of Japanese Application No. 2001-264812 filed in Japan on Aug. 31, 2001, the contents of which are incorporated by this reference.

BACKGROUND OF THE INVENTION

1. Field of the Invention

The present invention relates to a high-voltage discharge lamp lighting apparatus which is formed by integrating a high-voltage pulse generating transformer of a lighting apparatus to a lamp base such as a high-voltage discharge lamp and a floodlight projector, and a high-voltage discharge lamp apparatus and a floodlight projector apparatus using the lighting apparatus.

2. Description of the Related Art

Conventionally, a headlight lamp for automobile, e.g., a metal halide lamp high-voltage discharge lamp uses a high-voltage discharge lamp apparatus which is controlled such that high power is turned on upon starting and fast starting operation is obtained by using a stabilizer and a high-voltage generating apparatus (hereinafter, referred to as an ignitor circuit) for generating a high-voltage start pulse upon starting the light-on operation.

Hereinbelow, a description is given of the high-voltage discharge lamp lighting apparatus used for the headlight for automobile.

Referring to FIG. 10, the conventional high-voltage discharge lamp lighting apparatus comprises: a stabilizer 72 which supplies a power voltage necessary for maintaining the lighting operation to a high-voltage discharge lamp 80 based on a DC voltage from a DC power supply (not shown); and an ignitor circuit comprising an oscillating circuit-for-driving 73, which generates a start pulse upon starting the lighting operation of the high-voltage discharge lamp 80, and a high-voltage pulse generating transformer (hereinafter, abbreviated to a high-voltage pulse transformer) 74, which increases the voltage of the start pulse and generates a high-voltage pulse.

Referring to FIG. 10, the high-voltage discharge lamp lighting apparatus with the above-mentioned structure comprises a cap portion 76 which supports and fixes the high-voltage discharge lamp 80, and a socket portion 71 which is fit into the cap portion 76, and the cap portion 76 can be fit into the socket portion 71 and be detached therefrom. The cap portion 76 comprises connecting pieces 77a and 77b which are connected to electrode leads at both terminals of the high-voltage discharge lamp 80. The socket portion 71 into which the cap portion 76 is fit and attached comprises a connecting piece 75a which connects one output terminal of the stabilizer 72, and a connecting piece 75b which connects one end portion of a secondary coil 74b of the high-voltage pulse transformer 74.

A power voltage for starting the lighting operation and a power voltage necessary for maintaining the lighting operation are supplied to the high-voltage discharge lamp 80 by connecting the connecting pieces 77a and 77b in the cap portion 76 of the high-voltage discharge lamp 80 to the connecting pieces 75a and 75b in the socket portion 71.

That is, a lighting operation switch (not shown) in the high-voltage discharge lamp lighting apparatus is turned on and, then, the stabilizer 72 is driven. Next, the stabilizer 72 superimposes the high-voltage pulse generated by the high-voltage pulse transformer 74 to an AC power voltage necessary for maintaining the lighting operation supplied from a DC/AC inverter (not shown) in the stabilizer 72, based on the oscillating operation caused by charging and discharging of the oscillating circuit-for-driving 73, and supplies the superimposed voltage to the high-voltage discharge lamp 80.

As mentioned above, the lighting operation of the high-voltage discharge lamp 80 is started by the high-voltage pulses generated by the high-voltage pulse transformer 74, and the lighting operation is maintained by the AC power voltage necessary for maintaining the lighting operation from the stabilizer 72 after starting the lighting operation.

When the cap portion 76 in the high-voltage discharge lamp 80 is fit into and is attached to the socket portion 71 and the stabilizer 72 and the oscillating circuit 73 for driving are driven, an operator detaches the cap portion 76 from the socket portion 71 so as to replace the high-voltage discharge lamp 80 and, then, the stabilizer 72 drives the oscillating circuit 73 for driving, similarly to the start of the lighting operation of the high-voltage discharge lamp 80. Further, the stabilizer 72 generates the high-voltage pulses at the secondary coil 74b in the high-voltage pulse transformer 74, thereby generating the high-voltage pulses between the connecting pieces 75a and 75b of the socket portion 71. When the operator touches the connecting pieces 75a and 75b in this state, there is a danger for getting an electric shock.

In addition to the conventional art shown in FIG. 10, another examples of conventional art are: (1) the cap portion 76 includes the oscillating circuit 73 for driving and the high-voltage pulse transformer 74 and the socket portion 71 comprises only the stabilizer 72, (2) the cap protein 76 contains the high-voltage pulse transformer 74 and the socket portion 71 comprises the oscillating circuit 73 for driving and the stabilizer 72, and the like.

However, the conventional arts (1) and (2) have problems that the cap portion and the socket portion need four connecting pieces, respectively, the shape of the cap portion becomes large, and the high-voltage pulse transformer must be replaced together because the cap portion includes at least the high-voltage pulse transformer upon replacing the high-voltage discharge lamp and the replacement costs of high-voltage discharge lamp are increased.

SUMMARY OF THE INVENTION

The present invention is devised in consideration of the above problems and a first object is to provide a high-voltage discharge lamp lighting apparatus, a high-voltage discharge lamp apparatus, and a floodlight projector apparatus which are capable of preventing the default such as electric shock upon detaching the cap portion from the socket portion.

Further, a second object of the present invention is to provide a high-voltage discharge lamp lighting apparatus, a high-voltage discharge lamp apparatus, and a floodlight projector apparatus which are capable of easily connecting the cap portion to the socket portion by a small number of connecting pieces as much as possible and are capable of reducing replacement costs of the high-voltage discharge lamp portion upon replacing the high-voltage discharge lamp.

DISCLOSURE OF INVENTION

According to a first invention, high-voltage discharge lamp lighting apparatus comprises: lighting means comprising a stabilizer for supplying a power voltage necessary for maintaining the lighting operation to a high-voltage discharge lamp and an ignitor circuit comprising an oscillating circuit-for-driving for generating a start pulse upon starting the lighting operation of the high-voltage discharge lamp, and a high-voltage pulse generating transformer for increasing a voltage of the start pulse; cap means which attaches and holds the high-voltage discharge lamp, including a part of the high-voltage pulse generating transformer of the ignitor circuit; and socket means to which the cap means is fit and attached and which includes at least the oscillating circuit-for-driving in the ignitor circuit and a part of the high-voltage pulse generating transformer other than the included part of the cap means.

The high-voltage discharge lamp lighting apparatus with the above-mentioned structure is mainly used for a headlight apparatus for automobile, various illuminating apparatuses, or light source apparatuses for projection. A high-voltage discharge lamp uses mainly a metal halide lamp which is formed by adding metallic halide to a high-voltage mercury lamp. However, the high-voltage discharge lamp may use a high-voltage mercury lamp, a high-voltage natrium lamp, or a high-voltage rare gas discharge lamp.

The high-voltage discharge lamp is a light emitting tube comprising at least a translucent sealed container, a pair of electrodes, lead-in wires connected to the pair of electrodes, and a discharge medium.

The discharge medium uses either a first embodiment, in which a light-emitting metallic halide, mercury, and rare gas are used, or a second embodiment in which, essentially, mercury is not inputted by using a first halide as a light-emitting metallic halide and a second halide in place of mercury and rare gas.

The stabilizer in the lighting means comprises a DC/DC converter which stabilizes a predetermined DC power voltage to a power voltage, and a DC/AC inverter which converts the DC power voltage stabilized by the DC/DC converter into an AC power voltage.

The ignitor circuit in the lighting means comprises the oscillating circuit-for-driving and the high-voltage pulse generating transformer.

The oscillating circuit-for-driving comprises a charge capacitor and a discharge gap, and generates an oscillating voltage by the charge/discharge operation of the charge capacitor and the discharge gap based on the stabilized DC power voltage from the stabilizer.

The high-voltage pulse transformer generates a high-voltage pulse by increasing the oscillating voltage generated by the oscillating circuit-for-driving, superimposes the high-voltage pulse to the AC power voltage from the stabilizer necessary for maintaining the lighting operation, and supplies the superimposed voltage to the high-voltage discharge lamp.

The high-voltage pulse generating transformer comprises a primary coil and a secondary coil which are insulated each other, mutually having a magnetic core made of an iron core or ferrite core as a common magnetic path. An oscillation pulse voltage applied to the primary coil is increased based on a turn ratio of the primary coil and the secondary coil and the predetermined high-voltage pulse is outputted from the secondary coil.

A lamp base of the high-voltage discharge lamp is attached to the cap means and the cap means has two contacts which are connected to electrodes on both terminals of the high-voltage discharge lamp.

The socket means has at least two connecting pieces for supplying, to the two contacts of the cap means, the power voltage from the stabilizer necessary for maintaining the lighting operation from the stabilizer.

In the cap means, a part of the high-voltage pulse generating transformer is accommodated and arranged between one of the two contacts of the cap means and one electrode of the high-voltage discharge lamp. In the socket means, a part of the high-voltage pulse generating transformer is accommodated and arranged and, thus, the attachment and fitting of the cap means into the socket means causes the high-voltage pulse generating transformer to function.

According to the first invention, the fitting of the cap means into the socket means is reset and the cap means is detached from the socket means. Thus, the transformer function of the high-voltage pulse generating transformer is not operated and the generation of the high-voltage pulse stops at the connecting piece of the socket means. An electric shock is prevented.

The cap means and the socket means comprise two contacts for supplying the power voltage and at least two connecting pieces necessary for maintaining the lighting operation. A part of the high-voltage pulse transformer is arranged to the cap means and the socket means respectively and, therefore, the cap means and the socket means are reduced in size and the attaching space of the high-voltage discharge lamp is reduced.

Since the fitting structure of the cap means into the socket means is simplified, the operability for attaching and detaching the high-voltage discharge lamp is improved when replacing it.

Further, when replacing the high-voltage discharge lamp, the high-voltage discharge lamp and a part of the high-voltage generating transformer accommodated to the cap means are replaced together and, therefore, waste materials other than the high-voltage discharge lamp can be reduced as much as possible.

A high-voltage discharge lamp lighting apparatus according to a second invention is constructed such that: in the high-voltage discharge lamp lighting apparatus according to the first invention, the high-voltage pulse generating transformer included in the cap means comprises a magnetic core and a secondary coil forming the high-voltage pulse generating transformer, the socket means includes a primary coil of the high-voltage pulse generating transformer, and, the operation for fitting and attaching the cap means to the socket means causes to function as the high-voltage pulse generating transformer.

According to the second invention, the cap means includes the magnetic core of the high-voltage pulse generating transformer and the secondary coil, and the socket means includes the primary coil of the high-voltage pulse generating transformer. The attachment and fitting of the cap means to the socket means causes to function as a high-voltage pulse generating transformer. As a result, the cap means and the socket means have, as electric connecting means, only two contacts and two connecting pieces for supplying the power voltage necessary for maintaining the lighting operation. The cap means and the socket means are reduced in size and the attaching space of the high-voltage discharge lamp is reduced.

Since the structure of fitting the cap means into the socket means is simplified, the operability for attaching and detaching the high-voltage discharge lamp is improved when replacing it.

Further, when replacing the high-voltage discharge lamp, the high-voltage discharge lamp and a part of the high-voltage generating transformer accommodated to the cap means are replaced together and, therefore, waste materials other than the high-voltage discharge lamp can be reduced as much as possible.

A high-voltage discharge lamp lighting apparatus according to a third invention is constructed such that: in the high-voltage discharge lamp lighting apparatus according to the first invention, the high-voltage pulse generating transformer included in the cap means comprises a secondary coil forming the high-voltage pulse generating transformer, the socket means includes a primary coil and a magnetic core of the high-voltage pulse generating transformer, and the operation for fitting and attaching the cap means to the socket means causes to function as the high-voltage pulse generating transformer.

According to the third invention, the cap means includes the secondary coil of the high-voltage pulse generating transformer, and the socket means includes the primary coil of the high-voltage pulse generating transformer and the magnetic core. The attachment and fitting of the cap means to the socket means causes to function as a high-voltage pulse generating transformer. As a result, the cap means and the socket means have only two contacts and two connecting pieces for supplying the power voltage used for maintaining the lighting operation. The cap means and the socket means are reduced in size and the attaching space of the high-voltage discharge lamp is reduced.

Since the structure of fitting the cap means into the socket means is simplified, the operability for attaching and detaching the high-voltage discharge lamp is improved when replacing it.

Further, when replacing the high-voltage discharge lamp, the high-voltage discharge lamp and a part of the high-voltage generating transformer accommodated to the cap means are replaced together and, therefore, waste materials other than the high-voltage discharge lamp can be reduced as much as possible. As compared with the second invention, the cap means is reduced in size.

A high-voltage discharge lamp lighting apparatus according to a fourth invention is structured such that: in the high-voltage discharge lamp lighting apparatus according to the first invention, the high-voltage pulse generating transformer included in the cap means constitutes a part of a primary coil forming the high-voltage pulse generating transformer, the socket means includes a primary coil, a magnetic core, and a secondary coil of the high-voltage pulse generating transformer, and the operation for fitting and attaching the cap means to the socket means causes the formation of the primary coil of the high-voltage pulse generating transformer and further causes to function as the high-voltage pulse generating transformer.

According to the fourth invention, the cap means includes a part of the primary coil in the high-voltage pulse generating transformer, the socket means includes the primary coil, the magnetic core, and the secondary coil of the high-voltage pulse generating transformer, the fitting and attachment of the cap means to the socket means causes to function as the high-voltage pulse generating transformer. As a result, the cap means has two contacts connected to electrodes on both terminals of the high-voltage discharge lamp, and the socket means has three connecting pieces to one output terminal of the stabilizer, an end terminal of the primary coil in the high-voltage pulse generating transformer, and an end terminal of the high-voltage pulse generating transformer via the secondary coil from another output terminal of the stabilizer. The cap means and the socket means are reduced in size and the attaching space of the high-voltage discharge lamp can be reduced.

Since the structure of fitting the cap means into the socket means is simplified, the operability for attaching and detaching the high-voltage discharge lamp is improved when replacing it.

Further, when replacing the high-voltage discharge lamp, the high-voltage discharge lamp and a part of the high-voltage generating transformer accommodated to the cap means are replaced together and waste materials other than the high-voltage discharge lamp can be reduced as much as possible. As compared with the second and third inventions, the cap means is reduced in size.

A high-voltage discharge lamp lighting apparatus according to a fifth invention is structured such that: in the high-voltage discharge lamp lighting apparatus according to the first invention, the high-voltage pulse generating transformer included in the cap means comprises a magnetic core forming the high-voltage pulse generating transformer, the socket means includes a primary coil and a secondary coil of the high-voltage pulse generating transformer, and the operation for fitting and attaching the cap means to the socket means causes to function as the high-voltage pulse generating transformer.

According to the fifth invention, the cap means includes the magnetic core of the high-voltage pulse generating transformer, the socket means includes the primary coil and the secondary coil of the high-voltage pulse generating transformer, and the operation for fitting and attaching the cap means to the socket means causes to function as the high-voltage pulse generating transformer. As a result, the cap means and the socket means have, as electric connecting means, only two contacts and two connecting pieces for supplying the power voltage necessary for maintaining the lighting operation. The cap means and the socket means are reduced in size and the attaching space of the high-voltage discharge lamp is reduced.

Since the structure of fitting the cap means into the socket means is simplified, the operability for attaching and detaching the high-voltage discharge lamp is improved when replacing it.

Further, when replacing the high-voltage discharge lamp, the high-voltage discharge lamp and a part of the high-voltage generating transformer accommodated to the cap means are replaced together and, therefore, waste materials other than the high-voltage discharge lamp can be reduced as much as possible.

A high-voltage discharge lamp lighting apparatus according to a sixth invention is structured such that: in the high-voltage discharge lamp lighting apparatus according to the second or third invention, the socket means has a fitting and attaching portion which is formed into a cylindrical member, and two connecting pieces connected to two output terminals of the stabilizer are apart from each other in the axial direction and are arranged at different angles in the circumferential direction on the inner-circumferential side surface of the cylindrical member, and the cap means has a fitting and attaching portion which is formed into a cylindrical member and which can be fit into the inner circumference of the cylindrical member of the socket means, first and second contacts contact with the two connecting pieces are apart from each other in the axial direction with a ring shape on the outer-circumferential side surface of the cylindrical member of the cap means, the first contact is connected to one electrode of the high-voltage discharge lamp, and the second contact is connected to one end portion via the secondary coil of the high-voltage pulse generating transformer from another electrode of the high-voltage discharge lamp.

A high-voltage discharge lamp lighting apparatus according to a seventh invention is structured such that: in the high-voltage discharge lamp lighting apparatus according to the fourth invention, the socket means has a fitting and attaching portion which is formed into a cylindrical member, two connecting pieces connected to one output terminal of the stabilizer and a terminated end of the primary coil of the high-voltage pulse generating transformer are apart from each other in the axial direction and are arranged at different angles in the circumferential direction, and an inner-circumferential bottom surface of the cylindrical member of the socket means has a connecting piece on the high-voltage side which is connected to a terminated end from another output terminal of the stabilizer via the secondary coil of the high-voltage pulse generating transformer, and the cap means has a fitting and attaching portion which is formed into a cylindrical member fittable into the inner circumference of the cylindrical member of the socket means, the outer-circumferential side surface of the cylindrical member of the cap means has a first contact with a ring shape with which the two connecting pieces can make contact, the outer-circumferential bottom surface of the cylindrical member of the cap means has a contact on the high-voltage side with a projected shape which makes contact with the connecting piece on the high-voltage side, and the first contact and the contact on the high-voltage side are connected to electrodes on both terminals of the high-voltage discharge lamp.

A high-voltage discharge lamp lighting apparatus according to an eighth invention is structured such that: in the high-voltage discharge lamp lighting apparatus according to the fifth invention, the socket means has a fitting and attaching portion which is formed into a cylindrical member, the inner-circumferential side surface of the cylindrical member has a first connecting piece connected to one output terminal of the stabilizer, the inner-circumferential bottom surface of the cylindrical member has a connecting piece on the high-voltage side connected to a terminated end from another output terminal of the stabilizer via the secondary coil of the high-voltage pulse generating transformer, and the cap means has a fitting and attaching portion which is formed into a cylindrical member fittable into the inner circumference into the cylindrical member of the socket means, the outer-circumferential side surface of the cylindrical member of the cap means has a first contact with a ring shape with which the first connecting piece makes contact, the outer-circumferential bottom surface of the cylindrical member of the cap means has a contact on the high-voltage side which is in contact with the connecting piece on the high-voltage side, and the first contact and the contact on the high-voltage side are connected to electrodes on both terminals of the high-voltage discharge lamp.

A high-voltage discharge lamp lighting apparatus according to a ninth invention is structured such that: in the high-voltage discharge lamp lighting apparatus according to the fourth or seventh invention, the high-voltage pulse generating transformer comprises: a magnetic core comprising a first magnetic core member having a pair of leg portions and a U-shaped cross-section, and a second magnetic core member having one end which comes into contact with one leg portion of the first magnetic core member and another end which has a gap to the other leg portion of the first magnetic core member with an I-shape of the one end and the other end of the first magnetic core member opposed to each other; a secondary coil wound to the second magnetic core member; a primary coil which is wound to the secondary magnetic core member coaxially from the top of the secondary coil and apart therefrom; and an molding member for insulation covering which encloses the primary coil, the secondary coil, and the second magnetic core member except for its one end and which fills the gap formed between the first magnetic core member and the second magnetic core member.

With above-mentioned structure, the magnetic core has the first magnetic core member and the second magnetic core, and forms a closing circuit having a gap. The first magnetic core member has a U-shaped cross-section. Incidentally, the first magnetic core member may be vase-shaped as long as it has the U-shaped cross-section. The second magnetic core member is I-shaped. Further, the second magnetic core member has one end which comes into contact with one leg portion of the first magnetic core member and another end opposed to another leg portion thereof with a gap. Consequently, the magnetic core is formed.

Further, the magnetic core is formed of resin molded member containing ferrite molded member and ferrite minute particles. Although the ferrite is not limited to specific composition, preferably, it uses Ni—Zn system ferrite. When using the resin molded member as the magnetic core, as the ratio of the content of ferrite is higher, the magnetic property becomes preferable and, on the contrary, the moldability is reduced. Then, the ratio of the content of ferrite may be set to be an appropriate one. For example, preferably, the Ni—Zn system ferrite as the magnetic core contains 70% to 90% of the mass of Ni—Zn system ferrite minute particles, and its best ratio of content is approximately 80% of the mass of Ni—Zn system ferrite minute particles. The magnetic core is formed by the resin molded member containing the ferrite minute particles, thereby obtaining preferable magnetic property with high frequency. Further, the magnetic core is molded by using a resin molding machine, thereby facilitating the manufacturing with inexpensive price. In addition, the magnetic core with a complicated shape is easily formed.

The secondary coil is wound to the second magnetic core member. Since the high voltage is induced at the secondary coil, the secondary coil is made of an insulating member which has sufficient dielectric strength. Further, the secondary coil may directly be wound to the second magnetic core member or may be wound via an interlayer insulating sheet if necessary. Furthermore, the number of turns of the secondary coil is relatively high because the rate for increasing the voltage to the primary coil is increased as much as possible. Preferably, the secondary coil has one turn.

The primary coil is wound to the secondary magnetic core member with a coaxial relationship from the top of the secondary coil and apart from the secondary coil because the primary coil is at the low voltage and thus it is safe. Further, the primary coil has the reduced number of turns, that is, has the reduced number of turns as the half or more turn so as to increase the rate for increasing the voltage.

The molding member for insulation covering is made of resin having required dielectric strength, e.g., liquid crystal polymer, encloses the primary coil, the secondary coil, and the second magnetic core member except for the one end surface thereof, and fills a gap between the first magnetic core member and the second magnetic core member. Therefore, the second magnetic core member is covered with the molding member for insulation covering except for the one end surface. The polarity of the secondary coil is selected such that the terminal at the position on another end surface of the second magnetic core member has a high potential. The entire secondary coil is covered with the molding member for insulation covering. On the other hand, a space between the primary coil and the secondary coil is covered apart by the molding member for insulation covering and the entire space thereof is preferably covered. The gap formed between the first magnetic core member and the second magnetic core member of the magnetic core is filled with the molding member for insulation covering.

According to the ninth invention, although not necessary, the following components are selectively added if necessary so as to improve the performance of the high-voltage pulse generating transformer and to add the function thereof.

(1) Lead Means

Lead means connects the primary coil to an input circuit, e.g., the oscillating circuit, further connects the secondary coil to an output circuit, e.g., the high-voltage discharge lamp, and pierces through the molding member for insulation covering and is guided to the outside.

(2) Case

A case is used for accommodating the high-voltage pulse generating transformer alone or accommodating it together with a peripheral circuit so as to protect an accommodated part, adjust the appearance, and attach the part to a predetermined position. The case is made of proper resin. However, by forming the case made of resin additionally having ferrite minute particles, the high-voltage pulse generating transformer is magnetically shielded from the outside. In this case, the composition and content rate of ferrite is not limited to specific ones. However, generally, they are reduced as compared with those of the magnetic core. Upon using Ni—Zn system ferrite, preferably, for example, the resin contains approximately 35% to 65% of the mass of Ni—Zn system ferrite minute particles and, further, contains approximately 50% of the mass thereof as the best one. The case may be formed integrally with a part such as the oscillating circuit-for-driving or may be formed by individually molding a plurality of parts and by assembling them. In the latter case, the case can be divided into a case main body as a container and a cover.

(3) Socket Means

Socket means contributes to mechanically support the high-voltage discharge lamp and to form the electric connection when the high-voltage pulse generating transformer is used as a part of an ignitor circuit of the high-voltage discharge lamp for automobile. In this case, the integration of the socket means to the high-voltage pulse generating transformer reduces the leakage of the high-voltage energy. When the high-voltage pulse generating transformer is accommodated in the case, a part of the socket means is preferably integrated to the case upon arranging the socket means to the high-voltage pulse generating transformer.

According to the ninth invention, the primary coil is connected to an input circuit, e.g., the oscillating circuit-for-driving and the secondary coil is connected to an output circuit, e.g., a pair of electrodes of the high-voltage discharge lamp. Then, the voltage increasing action generates the high voltage between both ends of the secondary coil. The secondary coil is entirely covered with the molding member for insulation covering except for one end surface side on which the second magnetic core member comes into contact with the first magnetic core member and therefore the leakage of the high-voltage energy is certainly suppressed by setting the one end surface side of the secondary coil to the low-potential side.

Since the gap between the first and second magnetic core members is filled with the molding member for insulation covering, only by fitting the first magnetic core member to the molding member for insulation covering from the outside, a predetermined core gap can be precisely assured.

According to a tenth invention, a high-voltage discharge lamp comprises: a high-voltage discharge lamp lighting apparatus according to any one of the first to ninth inventions; and a high-voltage discharge lamp which is controlled for the lighting operation by the high-voltage discharge lamp lighting apparatus.

The high-voltage discharge lamp apparatus is formed by assembling the high-voltage discharge lamp to the high-voltage discharge lamp lighting apparatus according to any one of the first to ninth inventions.

According to an eleventh invention, a floodlight projector comprises: a high-voltage discharge lamp lighting apparatus according to any one of the first to ninth inventions; and a floodlight projector which is controlled for the lighting operation by the high-voltage discharge lamp lighting apparatus.

The floodlight projector apparatus is formed by assembling the floodlight projector to the high-voltage discharge lamp lighting apparatus according to any one of the first to ninth inventions.

The floodlight projector is a high-luminance discharge lamp which has sharp light-distribution and which emits illumination light with big height in one direction.

According to the tenth and eleventh inventions, in the high-voltage discharge lamp apparatus and the floodlight projector apparatus. The numbers of contacts and connecting pieces are reduced when the high-voltage discharge lamp or the floodlight projector is attached to the high-voltage discharge lamp lighting apparatus for the electric connection. Advantageously, the attachment operability is improved and the lamp attachment space is small.

BRIEF DESCRIPTION OF THE DRAWINGS

FIG. 7A is an explanatory diagram showing an attaching state of a connector shown in FIG. 6;

FIG. 7B is an explanatory diagram showing a detaching state of a part of the connector shown in FIG. 6;

FIG. 7C is an explanatory diagram showing a detaching state of the connector shown in FIG. 6;

FIG. 8 is a conceptual waveform diagram showing an output voltage of an ignitor circuit;

DETAILED DESCRIPTION OF THE PREFERRED EMBODIMENTS

Best Mode for Carrying out the Invention

Hereinbelow, the first embodiment of the present invention will be described with reference to FIGS. 1, 2A, and 2B.

Figure 1:
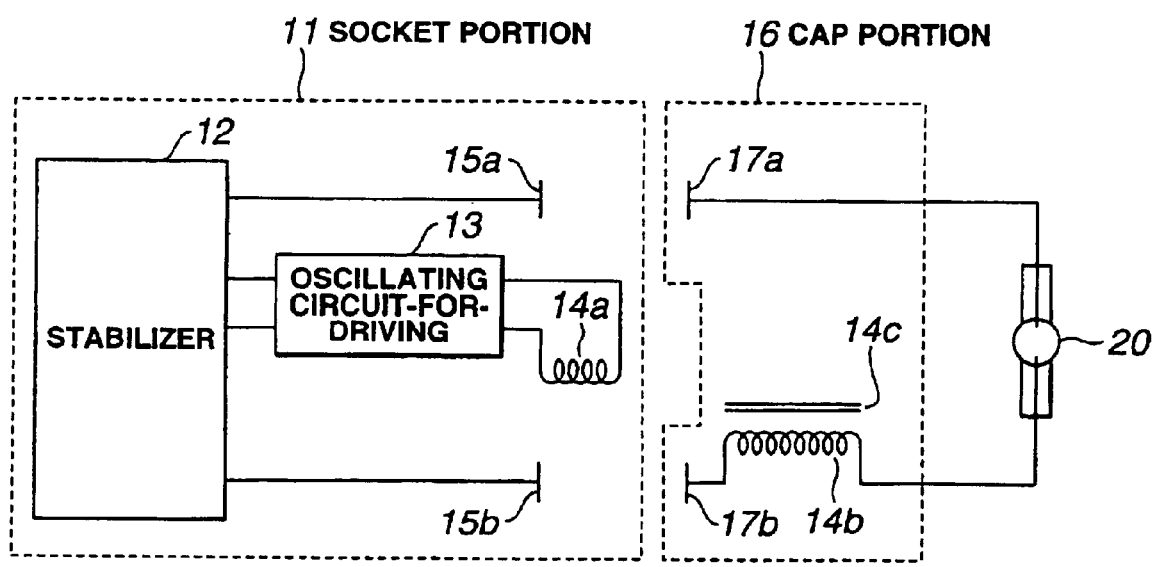
FIG. 1 is a block diagram of showing the structure of a high-voltage discharge lamp lighting apparatus according to the first embodiment of the present invention.
Figure 2A:
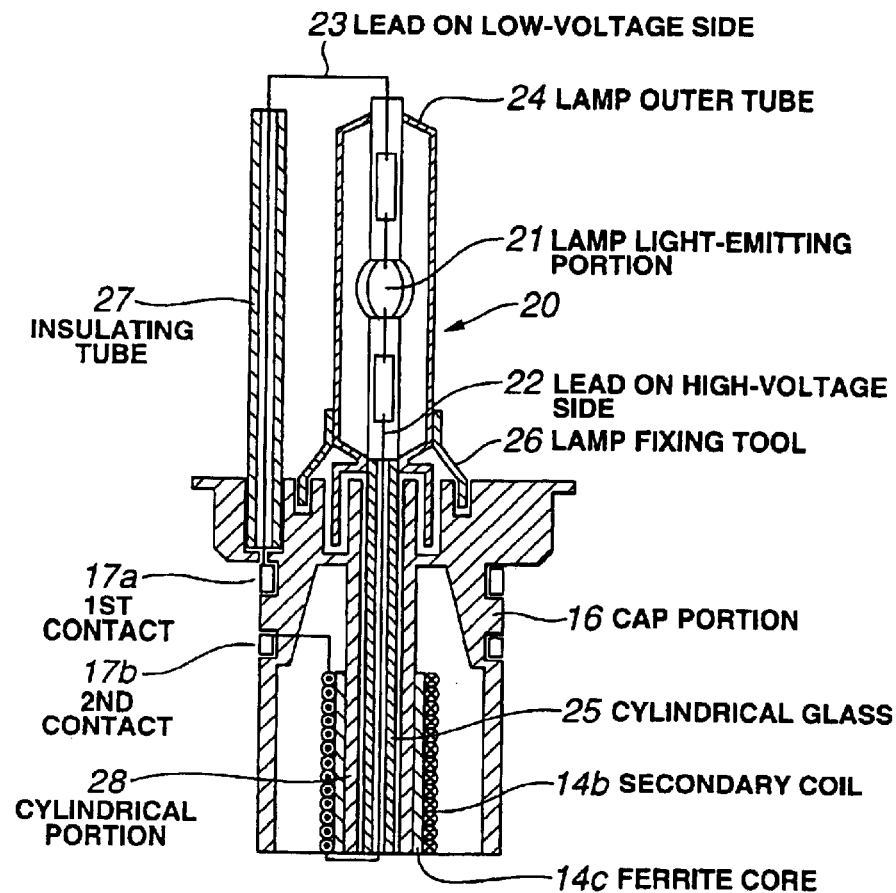
FIG. 2A is a sectional view for explaining the structure of a cap portion used for the high-voltage discharge lamp lighting apparatus according to the first embodiment of the present invention.
Figure 2B:
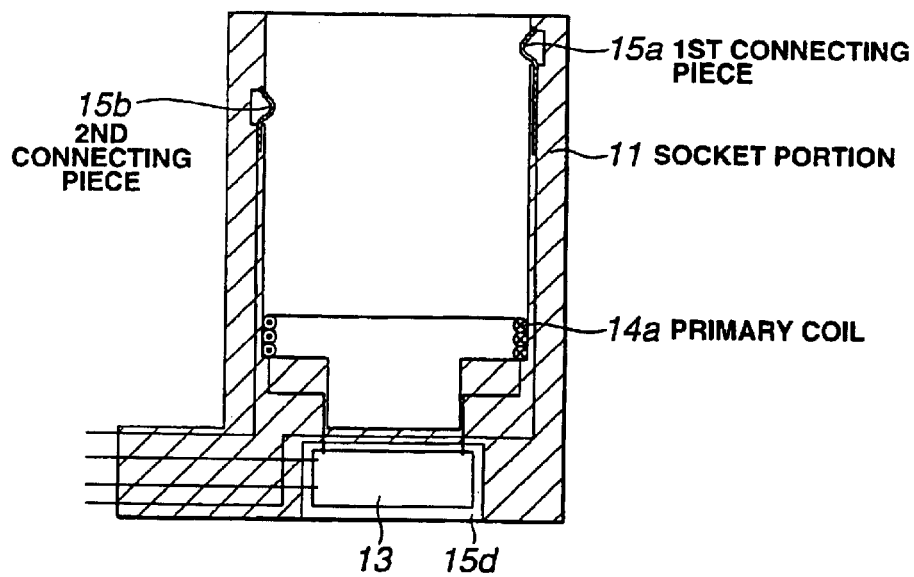
FIG. 2B is a sectional view for explaining the structure of a socket portion to which the cap portion shown in FIG. 2A is fit and attached.

FIG. 1 is a block diagram of showing the structure of a high-voltage discharge lamp lighting apparatus according to the first embodiment of the present invention, FIG. 2A is a sectional view for explaining the structure of a cap portion used for the high-voltage discharge lamp lighting apparatus according to the first embodiment of the present invention, and FIG. 2B is a sectional view for explaining the structure of a socket portion to which the cap portion shown in FIG. 2A is fit and attached. Here, a description is given of a lighting apparatus of a headlight lamp for automobile as the high-voltage discharge lamp lighting apparatus of the present invention.

The high-voltage discharge lamp lighting apparatus shown in FIG. 1 is in a state before fitting and attaching the cap portion 16 to the socket portion 11. By fitting and attaching the cap portion 16 to the socket portion 11, the high-voltage discharge lamp lighting apparatus functions as a high-voltage lamp lighting apparatus or a high-voltage discharge lamp apparatus. The high-voltage discharge lamp apparatus is formed by combining a lighting apparatus and a high-voltage discharge lamp.

The high-voltage discharge lamp lighting apparatus in the state in which the cap portion 16 is fit and attached to the socket portion 11 generates a predetermined DC voltage (e.g., 1200 V) for oscillation based on a DC voltage (e.g., 12 V) supplied from a DC power supply (not shown), and comprises the stabilizer 12 which generates a predetermined AC voltage necessary for maintaining the lighting operation of a high-voltage discharge lamp 20, an oscillating circuit-for-driving 13 which generates a lamp start pulse based on the DC voltage for oscillation upon starting the lighting operation of the high-voltage discharge lamp 20, and a high-voltage pulse generating transformer (hereinafter, abbreviated as the high-voltage pulse transformer) 14 which increases the start pulse and generates the high-voltage pulse (20 to 30 KV upon starting). The oscillating circuit-for-driving 13 and the high-voltage pulse transformer 14 constitute an ignitor circuit which starts the lighting operation of the high-voltage discharge lamp 20.

The oscillating circuit-for-driving 13 comprises an oscillating capacitor and a discharge gap 58, and charges the oscillating capacitor based on the DC voltage for oscillation generated by the stabilizer 12. Then, the oscillating capacitor is charged to 800 V, the discharge gap is discharged, and the charge voltage of the oscillating capacitor is sharply discharged.

The discharge current is applied to a primary coil 14a of the high-voltage pulse transformer 14 upon turning on the discharge gap 58. Due to the discharge current on the primary coil 14a side, the high-voltage pulse of approximately 20 KV generates at a secondary coil 14b.

The high-voltage pulse generated in the secondary coil 14b from the high-voltage pulse transformer 14 is superimposed to an AC power voltage used for maintaining the lighting operation, which is supplied to a serial circuit comprising the secondary coil 14b of the high-voltage pulse transformer 14 and the high-voltage discharge lamp 20, and then is supplied to the high-voltage discharge lamp 20.

That is, upon turning on a lighting operation switch (not shown) of the high-voltage discharge lamp lighting apparatus or the high-voltage discharge lamp apparatus, the stabilizer 12 is driven. Then, the high-voltage pulse generated by the oscillating operation due to the charge and discharge operation of the oscillating circuit-for-driving 13 and the voltage increasing action by the high-voltage pulse transformer 14 is superimposed to the AC power voltage used for maintaining the lighting operation supplied from the stabilizer 12, and is supplied to the high-voltage discharge lamp 20.

The high-voltage discharge lamp 20 starts the lighting operation by the high-voltage pulse generated by the high-voltage pulse transformer 14, and maintains the lighting operation by the AC power voltage from the stabilizer 12 after starting the lighting operation.

According to the first embodiment of the present invention, the high-voltage discharge lamp lighting apparatus has the cap portion 16 of the high-voltage discharge lamp 20 in which the secondary coil 14b of the high-voltage pulse transformer 14 and a magnetic core 14c made of a ferrite core are accommodated and arranged.

The cap portion 16 comprises a connecting piece 17a connected to one electrode of the high-voltage discharge lamp 20 and a connecting piece 17b connected to another electrode of the high-voltage discharge lamp 20 via the secondary coil 14b of the high-voltage pulse transformer 14.

The stabilizer 12, the oscillating circuit-for-driving 13, and the primary coil 14a of the high-voltage pulse transformer 14 are accommodated and arranged in the socket portion 11 to which the cap portion 16 is fit and attached. Further, the socket portion 11 comprises a connecting piece 15a which supplies one output of the stabilizer 12 to the connecting piece 17a of the cap portion 16 and a connecting piece 15b which supplies another output of the stabilizer 12 to the connecting piece 17b of the cap portion 16.

Only the oscillating circuit-for-driving 13 and the primary coil 14a of the high-voltage pulse transformer 14 are accommodated and arranged in the socket portion 11. The stabilizer 12 is externally provided for the socket portion 11. The stabilizer 12, the oscillating circuit-for-driving 13 accommodated and arranged in the socket portion 11, and the connecting pieces 15a and 15b can be connected by connecting electric wires.

As mentioned above, the secondary coil 14b and the magnetic core 14c of the high-voltage transformer 14 are arranged to the cap portion 16, and also the connecting pieces 17a and 17b are provided for the cap portion 16. Further, the primary coil 14a of the high-voltage pulse transformer 14 is arranged to the socket portion 11, and also the connecting pieces 15a and 15b are provided for the socket portion 11. When the cap portion 16 is fit and attached to the socket portion 11, the primary coil 14a of the high-voltage pulse transformer 14 in the socket portion 11 is arranged at predetermined positions of the secondary coil 14b and the magnetic core 14c of the high-voltage pulse transformer 14, so that the high-voltage pulse transformer 14 functions. Further, the connecting pieces 15a and 15b are electrically connected to the connecting pieces 17a and 17b, respectively.

Thus, upon starting the lighting operation of the high-voltage discharge lamp 20, the power voltage necessary for maintaining the lighting operation is supplied to the high-voltage discharge lamp 20 from the stabilizer 12 via the connecting pieces 15a, 15b, 17a, and 17b. The start pulse generated by the charge/discharge operation of the oscillating circuit-for-driving 13 is increased in voltage by the high-voltage pulse transformer 14, thereby becoming the high-voltage pulse. The high-voltage pulse is superimposed to the power voltage used for maintaining the lighting operation and is supplied to the high-voltage discharge lamp 20.

When the high-voltage discharge lamp 20 is lit on by the high-voltage pulse upon starting the lighting operation, an output voltage of a DC/DC converter in the stabilizer 12 is dropped and the DC current inputted to the oscillating circuit-for-driving 13 is decreased. Consequently, the generation of the oscillating voltage of the oscillating circuit-for-driving 13 automatically stops and the high-voltage discharge lamp 20 maintains the lighting operation by the AC power voltage used for maintaining the lighting operation which is supplied from a DC/AC converter in the stabilizer 12.

In the state of maintaining the lighting operation, the cap portion 16 is fit and attached to the socket portion 11 and, then, the connecting pieces 15a and 15b are disconnected from the connecting pieces 17a and 17b, respectively. Further, the primary coil 14a, the secondary coil 14b, and the magnetic core 14c of the high-voltage pulse transformer 14 are detached. Therefore, even if power is supplied to the oscillating circuit-for-driving 13 from the stabilizer 12 and the oscillating voltage is supplied to the primary coil 14a of the high-voltage pulse transformer 14, the generation of the high-voltage pulse stops because the primary coil 14a is detached from the secondary coil 14b. As a result, the danger such as the electric shock is prevented when replacing the high-voltage discharge lamp. The high-voltage discharge lamp lighting apparatus or the high-voltage discharge lamp apparatus can be provided with high safety.

A description is given of the specific structure of the cap portion 16 and the socket portion 11 with reference to FIGS. 2A and 2B.

The high-voltage discharge lamp 20 has a lamp light-emitting portion 21 made of glass including a discharge electrode surrounded by a lamp outer tube 24 made of glass. A lead on the high-potential side extended from the discharge electrode included in the lamp light-emitting portion 21 (hereinafter, abbreviated to a lead on the high-voltage side) 22 and a lead on the low-potential side (hereinafter, abbreviated to the lead on the low-voltage side) 23 are extended to the outside of the lamp outer tube 24 made of glass.

The high-voltage discharge lamp 20 is attached to the cap portion 16, as will be described later. The lead 22 on the high-voltage side pierces through a cylindrical glass 25 extended from the lamp outer tube 24, and is connected to an output terminal of the secondary coil 14b of the high-voltage pulse transformer 14, which will be described later.

The lead 23 on the low-voltage is connected to the first contact 17a via an insulating tube 27. The first contact 17a is connected to another output terminal of the power voltage used for maintaining the lighting operation of the stabilizer 12 via the first connecting piece 15a of the socket portion 11, which will be described later.

The cap portion 16 to which the high-voltage discharge lamp 20 is attached is formed substantially cylindrical with an insulating member. A cylindrical portion 28 is extended in the axial direction from the center of the cylindrical bottom of the cap portion 16. The cylindrical glass 25 is inserted into the cylindrical portion 28 and includes the lead 22 on the high-voltage side of the high-voltage discharge lamp 20.

A lamp fixing tool 26 which holds the high-voltage side of the lamp outer tube 24 is arranged to the center of the circular bottom surface on the top surface of the cap portion 16 in the drawing.

That is, the cylindrical glass 25 including the lead 22 on the high-voltage side of the high-voltage discharge lamp 20 is inserted into the cylindrical portion 28, thereby tightening and supporting the lead 22 on the high-voltage side of the lamp outer tube 24 by using the lamp fixing tool 26.

The secondary coil 14b of the high-voltage pulse transformer 14 is wound and attached to a cylindrical ferrite core 14c in the outer circumference of the cylindrical portion 28 and on the cylindrical bottom side of the cap portion 16.

A terminated end of the secondary coil 14b in the high-voltage pulse transformer 14 is connected to the lead 22 on the high-voltage side. A start end of the secondary coil 14b is connected to the second contact 17b arranged near the first contact 17a in the outer circumference of the cap portion 16.

On the other hand, the socket portion 11 is cylindrical-shaped with the bottom, which is made of the insulating member, and the outer circumference of the cap portion 16 is fixed and attached to the inner circumference which is cylindrical-shaped with the bottom. The first connecting piece 15a and the second connecting piece 15b which are connected to the first contact 17a and the second contact 17b of the cap portion 16 respectively are arranged to the top portion of the inner circumference which is cylindrically shaped with the bottom of the socket portion 11. The first contact 17a and the second contact 17b of the cap portion 16 are ring-shaped, and the first connecting piece 15a and the second connecting pieces 15b of the socket portion 11 are arranged at different angles on the inner circumference, thereby the fitting and attaching positions of the cap portion 16 and the socket portion 11 can be freely set.

A primary coil 14a of the high-voltage pulse transformer 14 is arranged to the bottom side of the cylindrical-shaped inner circumference with the bottom in the socket portion 11. At least when the cap portion 16 is fit and attached to the socket portion 11, the inner diameter of the primary coil 14a is formed with the size in which the outer circumference of the secondary coil 14b can be inserted, and the high-voltage pulse transformer 14 comprising the primary coil 14a, the secondary coil 14b, and the magnetic core 14c functions.

Both ends of the primary coil 14a arranged to the socket portion 11 are connected to the oscillating circuit-for-driving 13 accommodated in a concave portion 15d arranged to the bottom portion, and the first connecting piece 15a and the second connecting piece 15b are connected to the stabilizer 12 arranged to the outside of the socket portion 11.

Upon the cap portion 16 to which the high-voltage discharge lamp 20 being attached is fit and attached to the socket portion 11 by using the cap portion 16 and the socket portion 11 with the above structure and, the primary coil 14a and the secondary coil 14b in the high-voltage pulse transformer 14 perform a transformer function via the magnetic core 14c. The first connecting piece 15a and the second connecting piece 15b are electrically connected to the first contact 17a and the second contact 17b of the cap portion 16 respectively.

Thus, the stabilizer 12 supplies the power voltage used for maintaining the lighting operation via the connecting pieces 15a, 15b, 17a, and 17b. The oscillating voltage supplied from the oscillating circuit-for-driving 13 is increased by the primary coil 14a and the secondary coil 14b in the high-voltage pulse transformer 14, the high-voltage pulse for starting the lighting operation is generated, then, the generated high-voltage pulse is superimposed to the power voltage used for maintaining the lighting operation, and the superimposed voltage is supplied to the high-voltage discharge lamp 20.

Upon the cap portion 16 being detached from the socket portion 11 and, the connection of the connecting pieces 15a, 15b, 17a, and 17b is shut off. Further, the connection of the primary coil 14a and the secondary coil 14b in the high-voltage pulse transformer 14 is also shut off and, if the operator touches the socket portion 11, there is no danger for electric shock.

The high-voltage discharge lamp 20 can easily be replaced by replacing the entire cap portion 16 including the secondary coil 14b and the ferrite core 14c in the high-voltage pulse transformer 14 and the high-voltage discharge lamp 20. Further, the socket portion 11 including the oscillating circuit-for-driving 13 and the primary coil 14a in the high-voltage pulse transformer 14 can be reused.

Figure 3A:
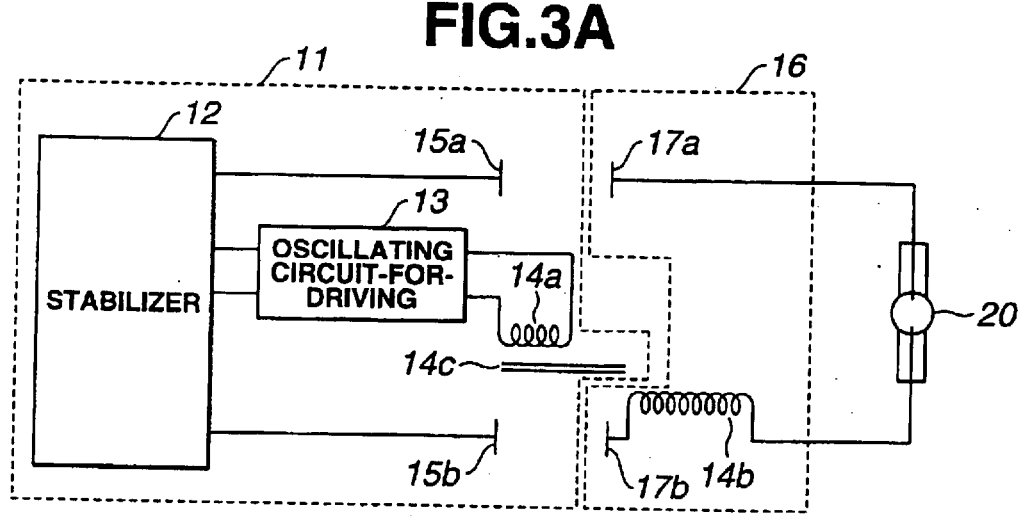
FIG. 3A is a block diagram showing the structure of a high-voltage discharge lamp lighting apparatus according to the second embodiment of the present invention.
Figure 3B:
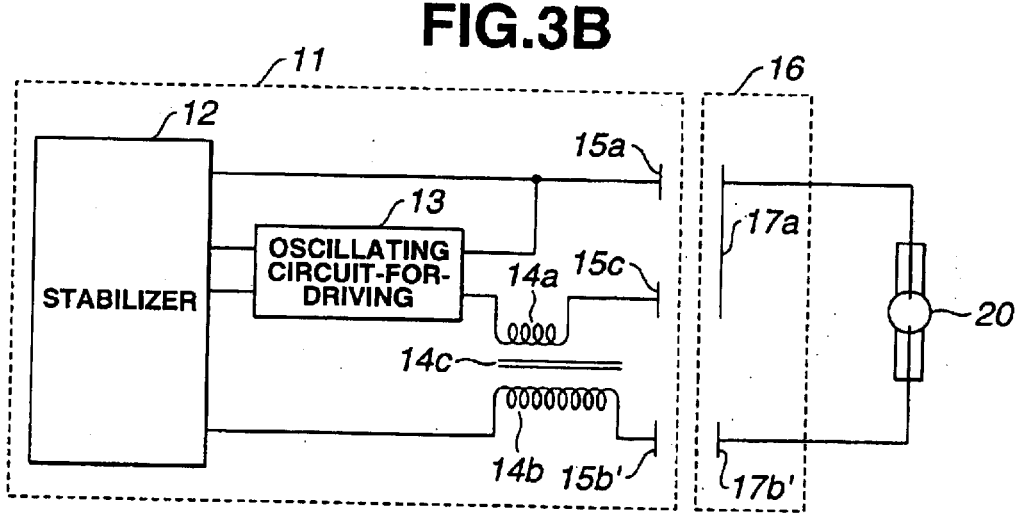
FIG. 3B is a block diagram showing the structure of a high-voltage discharge lamp lighting apparatus according to the third embodiment of the present invention.
Figure 3C:
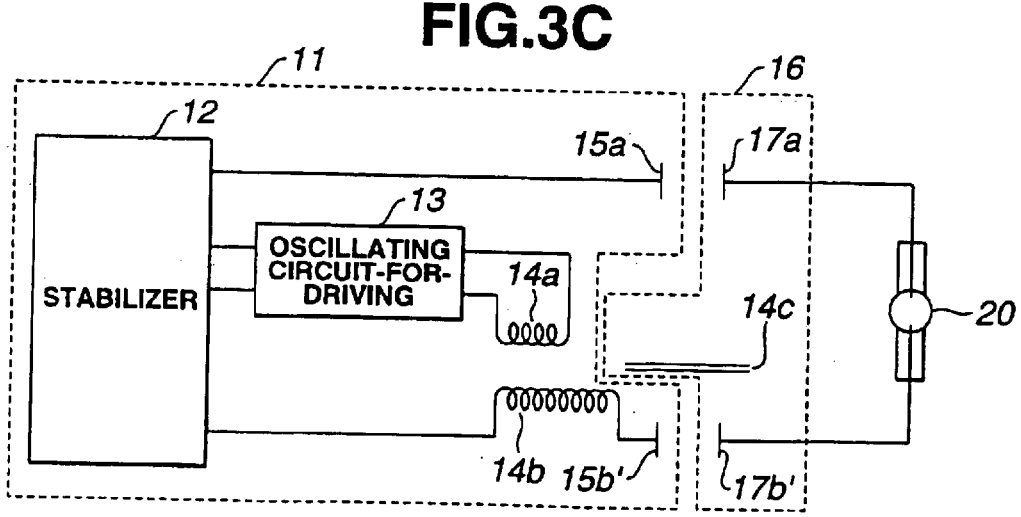
FIG. 3C is a block diagram showing the structure of a high-voltage discharge lamp lighting apparatus according to the fourth embodiment of the present invention.

Next, a description is given of high-voltage discharge lamp lighting apparatuses according to the second to fourth embodiments of the present invention with reference to FIGS. 3A to 3C. The same portions in FIGS. 3A to 3C as those in FIG. 1 are designated by the same reference numerals and a detailed description is omitted. FIGS. 3A to 3C show states before fitting and attaching the cap portion 16 to the socket portion 11.

Referring to FIG. 3A, according to the second embodiment of the present invention, the socket portion 11 comprises: the stabilizer 12; the oscillating circuit-for-driving 13 which generates a high-frequency oscillating voltage based on the DC power voltage from the stabilizer 12; the primary coil 14a and the ferrite core 14c of the high-voltage pulse transformer 14 to which the high-frequency oscillating voltage generated by the oscillating circuit-for-driving 13 is supplied. Further, the socket portion 11 has the first connecting piece 15a and the second connecting piece 15b which output the power voltage necessary for maintaining the lighting operation from the stabilizer 12.

The cap portion 16 comprises: the secondary coil 14b of the high-voltage pulse transformer 14; the second contact 17b for connection to one electrode of the high-voltage discharge lamp 20 via the secondary coil 14b; and the first contact 17a for connection to another electrode of the high-voltage discharge lamp 20.

That is, upon the cap portion 16 being fit and attached to the socket portion 11, the first connecting piece 15a and the second connecting piece 15b are connected to the first contact 17a and the second contact 17b, respectively. Further, the secondary coil 14b of the high-voltage pulse transformer 14 arranged to the cap portion 16 is positioned to the side surface of the magnetic core 14c of the high-voltage pulse transformer 14 arranged to the socket portion 11, and the high-voltage pulse transformer 14 is formed. Thus, the high-voltage discharge lamp 20 starts the lighting operation.

The high-voltage discharge lamp lighting apparatus according to the second embodiment is realized by moving the magnetic core 14c made of the ferrite core arranged to the cap portion 16 shown in FIG. 2A to the inner circumference of the primary coil 14a in the socket portion 11 shown in FIG. 2B.

As a result, when replacing the high-voltage discharge lamp 20, the cap portion 16 having the high-voltage discharge lamp 20 and the secondary coil 14b is replaced. The replacement cost of the cap portion 16 is more inexpensive than that according to the first embodiment of the present invention by as much as the price of the ferrite core 14c.

According to the first and second embodiments of the present invention, the first contact 17a and the second contact 17b of the cap portion 16 are ring-shaped, and the first connecting piece 15a and the second connecting piece 15b arranged to the socket portion 11 are a single connecting piece, thereby freely setting the direction for fitting and attaching the cap portion 16 to the socket portion 11. Although not shown, a plurality of projections are provided at a predetermined interval at the outer circumference of the cap portion 16 and a plurality of guide grooves are provided at a predetermined interval for fitting to the projections of the cap portion 16 at the inner circumference of the socket portion 11. The projections may be fit into the guide grooves, thereby freely setting and attaching the high-voltage discharge lamp 20 within an angle of a predetermined interval.

Next, a description is given of the third embodiment of the present invention with reference to FIG. 3B. According to the third embodiment, the socket portion 11 has the oscillating circuit-for-driving 13 and the high-voltage pulse transformer 14. One output terminal of the oscillating circuit-for-driving 13 arranged to the socket portion 11 is connected to one output terminal of the stabilizer 12 and the first connecting piece 15a. Another output terminal of the oscillating circuit-for-driving 13 is connected to a third connecting piece 15c via the primary coil 14a of the high-voltage pulse transformer 14.

An output terminal of the secondary coil 14b in the high-voltage pulse transformer 14 is connected to a second connecting piece 15b' on the high-potential side.

A start end of the secondary coil 14b in the high-voltage pulse transformer 14 is connected to the other output terminal of the stabilizer 12 and a terminated end is connected to the second connecting piece 15b' on the high-potential side.

The cap portion 16 comprises: the first contact 17a to which an electrode on the low-potential side of the high-voltage discharge lamp 20 is connected; and a second contact 17b' to which an electrode on the high-potential side is connected. The first contact 17a is formed with the length longer than that of shown in FIG. 1 or 3A so as to form a part of the primary coil 14a. Further, the first contact 17a is in contact with and is connected to the first connecting piece 15a of the socket portion 11 and the third connecting piece 15c.

In other words, the cap portion 16 is fit and attached to the socket portion 11 and, then, the first connecting piece 15a and the third connecting piece 15c in the socket portion 11 are connected to the first long contact 17a of the cap portion 16. The second connecting piece 15b' of the socket portion 11 is connected to the second contact 17b' of the cap portion 16. Thus, the high-frequency oscillating voltage can be supplied from the oscillating circuit-for-driving 13 to the primary coil 14a in the high-voltage pulse transformer 14.

Consequently, the start and the maintaining of the lighting operation of the high-voltage discharge lamp 20 are possible due to the output of the power voltage used for maintaining the lighting operation from the stabilizer 12 and due to the increased voltage and output thereof in the high-voltage pulse transformer 14 by the oscillating voltage of the oscillating circuit-for-driving 13.

The fitting of the cap portion 16 into the socket portion 11 is canceled, thereby disconnecting the first connecting piece 15a and the third connecting piece 15c from the first contact 17a of the cap portion 16 in the primary coil 14a of the high-voltage pulse transformer 14. The primary coil 14a of the high-voltage pulse transformer 14 is opened, thereby stopping the operation for generating the high-voltage pulses.

As a result, there is no danger for electric shock upon replacing the high-voltage discharge lamp 20. When replacing the high-voltage discharge lamp 20, the cap portion 16 having only the connecting pieces 17a and 17b' and only the high-voltage discharge lamp 20 are replaced and the replacement costs are exceedingly reduced.

Figure 4A:
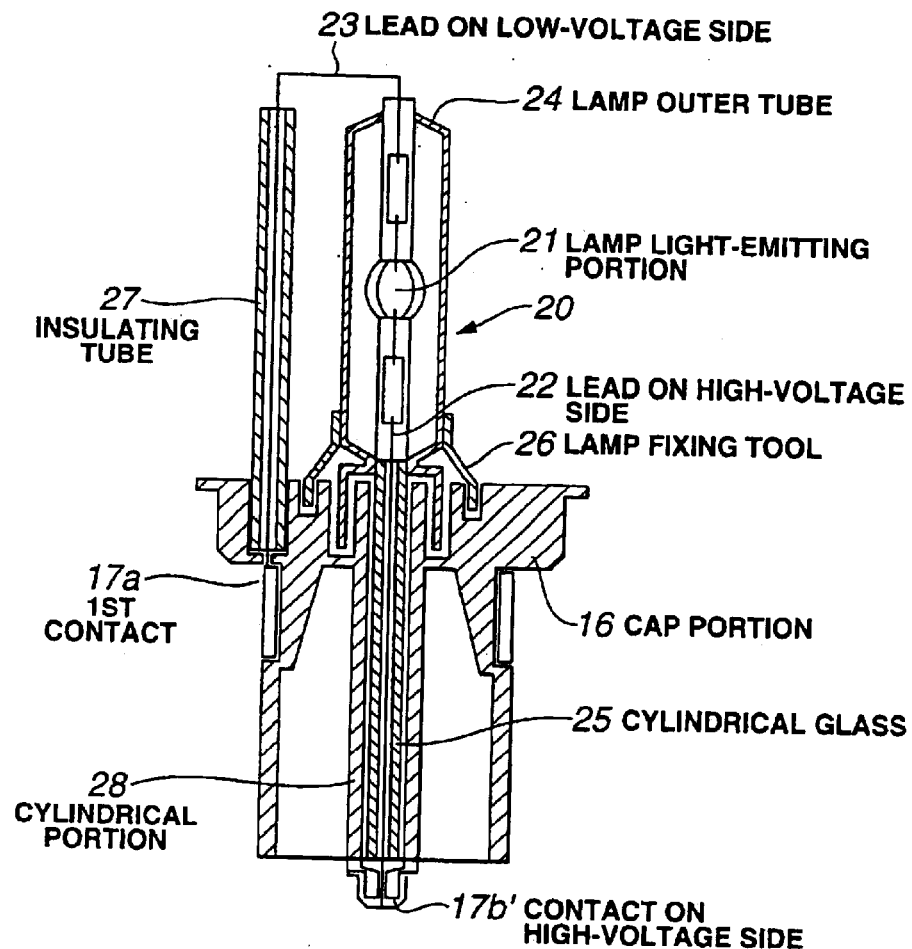
FIG. 4A is a sectional view for explaining the structure of a cap portion and a socket portion used for the high-voltage discharge lamp lighting apparatus according to the third embodiment of the present invention.
Figure 4B:
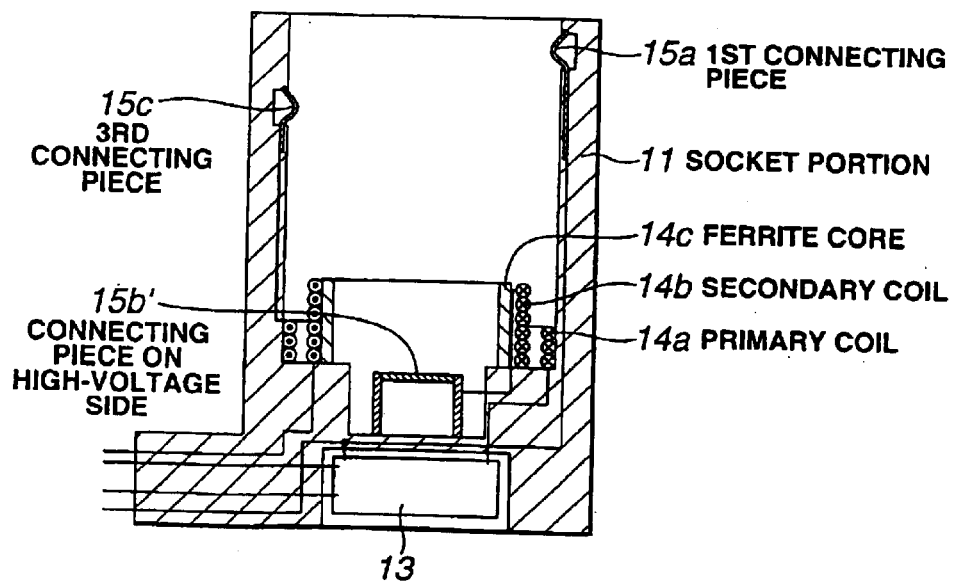
FIG. 4B is a sectional view for explaining the structure of the socket portion to which the cap portion shown in FIG. 4A is fit and attached.

Referring to FIG. 3B, according to the third embodiment, the high-voltage discharge lamp lighting apparatus comprises the cap portion 16 and the socket portion 11 as shown in FIGS. 4A and 4B. Referring to FIGS. 4A and 4B, the same portions as those shown in FIGS. 2A and 2B are designated by the same reference numerals and a detailed description is omitted.

Referring to FIG. 4B, the socket portion 11 comprises the primary coil 14a, the secondary coil 14b, and the magnetic core 14c of the high-voltage pulse transformer 14. One output terminal from the stabilzier 12 is connected to the first connecting piece 15a and a terminated end of the primary coil 14a is connected to the third connecting piece 15c in the socket portion 11. A terminated end of the secondary coil 14b is connected to the connecting piece 15b' on the high-voltage side in the center of the bottom portion of the socket portion 11.

Referring to FIG. 4A, a first contact 17a is arranged to the cap portion 16 like strips so as to connect the first connecting piece 15a to the third connecting piece 15c in the socket portion 11. The first contact 17a is connected to a lead 23 on the low-voltage side of the lamp light-emitting portion 21. The contact 17b' to which a lead 22 on the high-voltage side is connected in the cap portion 16 is projected to the bottom of the cap portion 16. Thus, the contact 17b' on the high-voltage side is connected to the connecting piece 15b' on the high-voltage side of the socket portion 11.

The operation for fitting the socket portion 11 into the cap portion 16 enables a contact of the first connecting piece 15a and the third connecting piece 15c of the socket portion 11 with the first contact 17a of the cap portion 16. Further, the connection of the connecting piece 15b' on the high-voltage side in the socket portion 11 and the contact 17b' on the high-voltage side in the cap portion 16 enables the closing of the terminated end of the primary coil 14a, thereby functioning as the high-voltage pulse transformer 14.

With the above-mentioned structure shown in FIGS. 4A and 4B, the lamp socket is integrated to the high-voltage pulse transformer and it is not necessary to provide and pull out an additional cable tolerant of the high-voltage between the high-voltage pulse transformer and the high-voltage discharge lamp. Therefore, the high-voltage pulse transformer is realized with the leakage of the high-voltage energy being suppressed.

The fourth embodiment of the present invention will be described with reference to FIG. 3C. According to the fourth embodiment, the socket portion 11 comprises the oscillating circuit-for-driving 13, the primary coil 14a of the high-voltage pulse transformer 14, and the secondary coil 14b thereof. The socket 16 comprises the first connecting piece 15a to which one output terminal of the stabilizer 12 is connected, and the second connecting piece 15b' on the high-potential side connected to another output terminal of the stabilizer 12 via the secondary coil 14b of the high-voltage pulse transformer 14.

That is, a space exists between the primary coil 14a and the secondary coil 14b of the high-voltage pulse transformer 14 arranged to the socket portion 11 and thus the operation as the transformer is not started.

On the other hand, the cap portion 16 comprises the first contact 17a to which the electrode on the low-potential side of the high-voltage discharge lamp 20 is connected, the second contact 17b' to which the electrode on the high-potential side is connected thereof, and the magnetic core 14c made of the ferrite core.

The magnetic core 14c arranged to the cap portion 16 is inserted between the primary coil 14a and the secondary coil 14b of the high-voltage pulse transformer 14 arranged to the socket portion 11 upon fitting and attaching the cap portion 16 to the socket portion 11.

That is, upon the cap portion 16 being fit and attached to the socket portion 11, the first connecting piece 15a of the socket portion 11 and the second connecting piece 15b' thereof are connected to the first contact 17a and the second contact 17b' of the cap portion 16 respectively, and the magnetic core 14c is inserted between the primary coil 14a and the secondary coil 14b of the high-voltage pulse transformer 14.

With the structure according to the fourth embodiment, the magnetic core 14c made of the ferrite core arranged to the socket portion 11 shown in FIG. 4B is arranged to the inner-circumference side of the cap portion 16, the third connecting piece 15c of the socket portion 11 is disused, and the magnetic core 14c made of the ferrite core arranged to the cap portion 16 is inserted between the primary coil 14a and the secondary coil 14b arranged to the socket portion 11.

Thus, the high-voltage pulse transformer 14 is formed, predetermined high-voltage pulses generate, and the power voltage for starting the lighting operation is supplied to the high-voltage discharge lamp 20. The resetting of the fitting between the cap portion 16 and the socket portion 11 shuts off the contact between the connecting pieces 15a and 15b' and contacts 17a and 17b'. Further, the magnetic core 14c made of the ferrite core in the high-voltage pulse transformer 14 is detached, the voltage increasing operation stops between the primary coil 14a and the secondary coil 14b, and the generation of high-voltage pulses stops.

As a result, there is no danger for electric shock upon replacing the high-voltage discharge lamp 20. Upon replacing the high-voltage discharge lamp 20, the cap portion 16 including the magnetic core 14c made of the ferrite core and the high-voltage discharge lamp 20 are replaced and the replacement costs are relatively reduced.

According to the third and fourth embodiments of the present invention, similarly to the first and second embodiments, the first contact 17a and the second contact 17b' of the cap portion 16 are ring-shaped. However, the connecting piece 15b' arranged to the socket portion 11 is arranged to the bottom portion on the inner circumference of the socket portion 11 as shown in FIG. 4B in view of the safety upon connection. Preferably, the contact 17b' on the high-voltage side of the cap portion 16 in the high-voltage discharge lamp 20 connected to the above arrangement is projected onto the outer bottom-portion of the cap portion 16.

Thus, the cap portion 16 can be fit and attached to the socket portion 11 at a free angle in the circumferential direction.

Further, according to the third and fourth embodiments, a plurality of projections are provided to the outer circumference of the cap portion 16 (not shown) and are fit into a plurality of guide grooves arranged at a predetermined interval for fitting into the projections of the cap portion 16 on the inner circumference of the socket portion 11. Consequently, the direction of the high-voltage discharge lamp 20 may freely be set and the cap portion 16 may be attached to the socket portion 11 at the predetermined interval.

As mentioned above, when the high-voltage discharge lamp lighting apparatus is used for the headlight for automobile, light projected in the direction of an insulating tube 27 (refer to FIGS. 2A and 4A) from the lamp light-emitting portion 21 in the high-voltage discharge lamp used as the headlight interferes in the insulating tube 27. Therefore, conventionally, attention is paid to the direction for attaching the high-voltage discharge lamp. However, the high-voltage discharge lamp lighting apparatus of the present invention has a simple attaching structure in which two contacts and at least two connecting pieces are used for the cap portion 16 and the socket portion 11. Therefore, the direction between the socket portion 11 and the high-voltage discharge lamp attached and fixed to the cap portion 16 can freely be set, and are easily set within a limiting value of a predetermined projection angle.

Figure 5A:
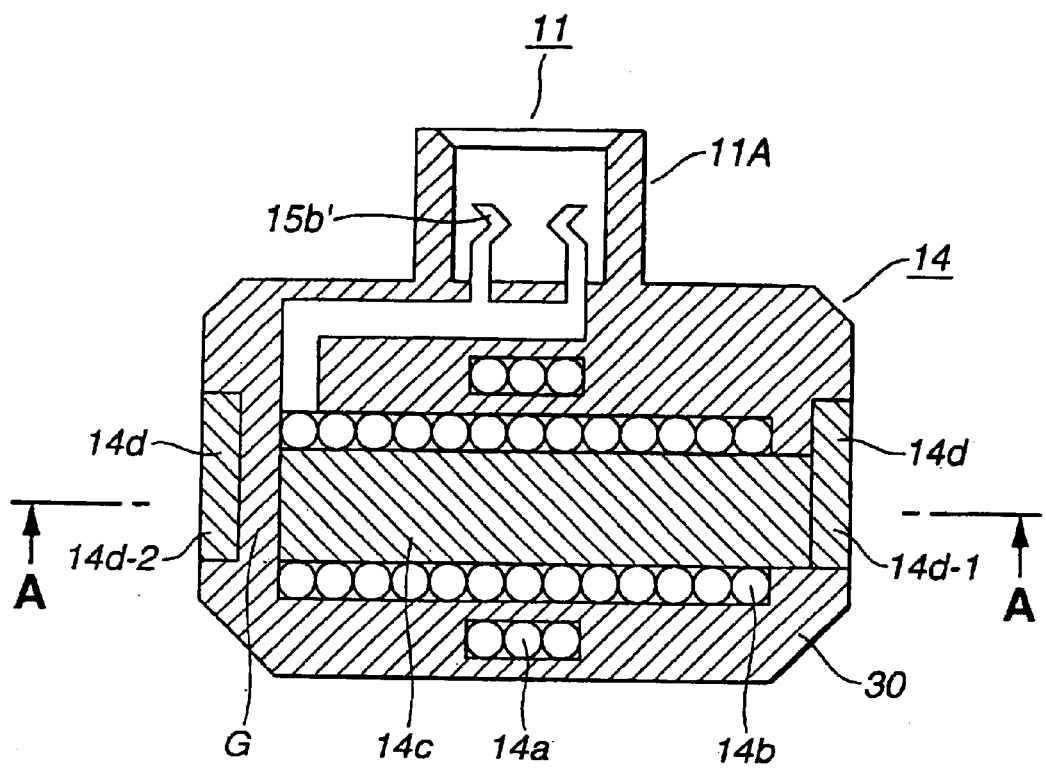
FIG. 5A is a front-sectional view showing the main structure of a high-voltage pulse generating transformer used for the high-voltage discharge lamp lighting apparatus according to the third embodiment of the present invention.
Figure 5B:
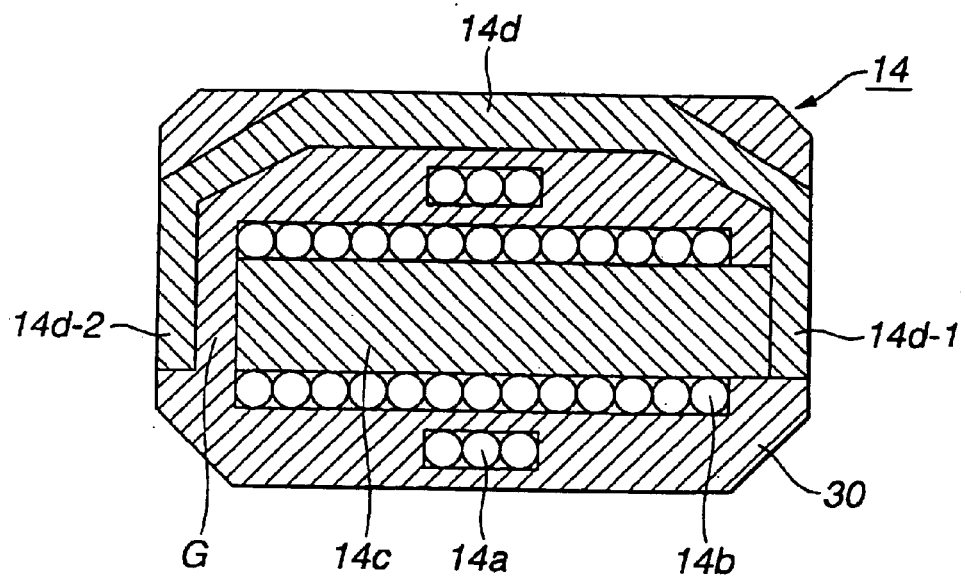
FIG. 5B is a plan sectional view of an A—A line shown in FIG. 5A.

FIGS. 5A and 5B show the structure of a high-voltage pulse transformer and a lamp socket integrated therewith according to one embodiment. FIG. 5A is a front sectional view showing a main portion and FIG. 5B is a plan sectional view showing a main portion corresponding to an A—A line shown in FIG. 5A. The high-voltage pulse transformer with the lamp socket shown in FIGS. 5A and 5B corresponds to the structure of the socket portion 11 shown in FIG. 3B and, however, is different from the structure of the socket portion shown in FIG. 4B in the structure of the high-voltage pulse transformer. Referring to FIGS. 5A and 5B, reference numeral 14 denotes the high-voltage pulse transformer and reference numeral 11 denotes the lamp socket.

The high-voltage pulse transformer 14 comprises: a magnetic core comprising first and second magnetic core members 14d and 14c; the secondary coil 14b; the primary coil 14a; the power feed contact 15b' on the high-potential side; and an molding member for insulation covering 30.

The magnetic core is formed by molding resin containing approximately 80% of the mass of Ni—Zn system ferrite minute particles, and comprises the first magnetic core member 14d with a U-shape and the second magnetic core member 14c with an I-shape. The inner surface on the edge of one leg portion 14d-1 of the first magnetic core member 14d comes into contact with one end surface of the second magnetic core member 14c. A gap G, so-called a core gap is formed between the inner surface on the edge of another leg portion 14d-2 of the first magnetic core member 14d and another end surface of the second magnetic core member 14c.

The secondary coil 14b is directly wound to the second magnetic core member 14c. The primary coil 14a is wound around the second magnetic core member 14c, apart outward from the secondary coil 14b.

The molding member for insulation covering 30 is made of liquid crystal polymer, covers the second magnetic core member 14c, the secondary coil 14b, and the primary coil 14a except for the one end surface of the magnetic core member 14c, fills a space between the secondary coil 14b and the primary coil 14a, and further fills the gap G. The first magnetic core member 14d is covered with the molding member for insulation covering 30 while it is partly exposed to the outside.

Figure 6:
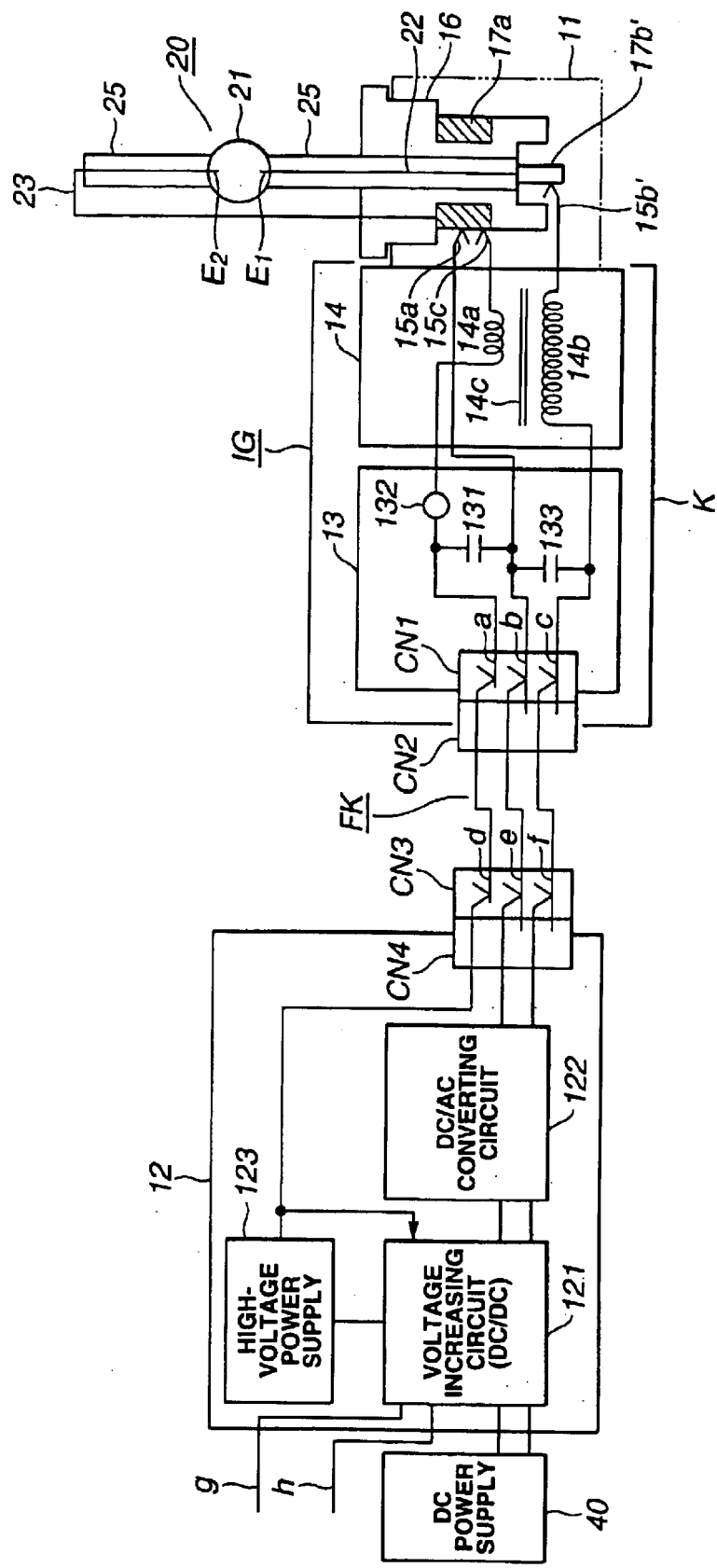
FIG. 6 is a block diagram showing the structure of a high-voltage discharge lamp lighting apparatus shown in FIG. 3B according to the third embodiment of the present invention.

The lamp socket 11 comprises a lamp socket main body 11A, the power feed connecting piece 15b' on the high-potential side, and power feed connecting pieces (not shown) (refer to reference numerals 15a and 15c in FIG. 6). The lamp socket main body 11A is cylindrical-shaped and is integrally molded to the molding member for insulation covering 30. The power feed connecting piece 15b' on the high potential side is clip-shaped, for example, pierces through the molding member for insulation covering 30 from an end portion on the high-potential side of the secondary coil 14b, and is guided in the lamp socket main body 11A. Although an end portion on the low-potential side of the secondary coil 14b is not shown, it is connected to the potential on the ground.

In the structure shown in FIGS. 5A and 5B, the lamp socket is integrated to the high-voltage pulse transformer and another cable tolerant of the high-voltage does not need to be pulled out between the high-voltage pulse transformer and the high-voltage discharge lamp. Therefore, the high-voltage pulse transformer is realized with the leakage of high-voltage energy suppressed.

FIGS. 6 to 8 are diagrams showing the structure of specific circuits in the high-voltage discharge lamp lighting apparatus corresponding to the structure shown in FIG. 3B. FIG. 6 is a circuit block diagram showing lighting means and the high-voltage discharge lamp. FIG. 7 is an explanatory diagram showing the detaching state of a connector. FIG. 8 is a waveform diagram showing an output voltage waveform of the ignitor circuit.

The high-voltage discharge lamp lighting apparatus shown in FIG. 6 comprises: an ignitor circuit IG comprising the oscillating circuit-for-driving 13 and the high-voltage pulse transformer 14; an insulating case K for accommodating the ignitor circuit IG; the lamp socket (shown by two-dotted chain line) 11 for supporting the high-voltage discharge lamp 20, integrally connected to the case K; the stabilizer 12 connected to the ignitor circuit IG via connectors CN1 and CN2, a cable FK, and connectors CN3 and CN4; and a DC power supply 40 for supplying a power voltage to the stabilizer 12.

The high-voltage discharge lamp 20 is a light-emitting tube comprising at least a translucent sealed container, a pair of electrodes E1 and E2, external lead-in wires 22 and 23 connected to the pair of electrodes E1 and E2, and a discharge medium. The lamp light-emitting portion 21 comprises the translucent sealed container, the pair of electrodes, and the discharge medium. The translucent sealed container is made of silica glass.

The cap portion 16 comprises a cap main body which is formed by molding an insulating member, comprising the receiving contact 17b' on the high-potential side and the receiving contact 17a on the low-potential side. The cap main body is fixed to a cylindrical glass 25 used for sealing of the high-voltage discharge lamp 20. The cap portion 16 is inserted and is attached to the lamp socket 11. The receiving contact 17b' on the high-potential side is pin-shaped and is arranged coaxially on the lamp light-emitting portion 21 and in a concave portion on the lower end of the cap main body. The receiving contact 17a on the low-electrode side is ring-shaped and is arranged on the outer-circumferential side surface of the cap main body.

When the high-voltage discharge lamp 20 is attached to the lamp socket 11, the receiving contact 17a on the low-electrode side is electrically connected with the power feed connecting piece 15a on the low-electrode side on the lamp socket 11 side and with the power feed connecting piece 15c on the low-electrode side apart therefrom. The receiving contact 17b' on the high-electrode side is electrically connected with the receiving contact 15b' on the high-potential side connected to one end of the secondary coil 14b.

The oscillating circuit-for-driving 13 comprises capacitors 131 and 133, a discharge gap 132, and the connector CN1. The capacitor 131 supplies charges for oscillation, and is connected between contacts a and b of the connector CN1 at one end thereof. The discharge cap 132 is connected to the capacitor 131 at one end thereof and is connected to one end of the primary coil 14a of the high-voltage pulse transformer 14 at another end thereof. The conductive member 15a of the lamp socket 11 is connected to the contact b of the connector CN1. The conductive member 15c apart from the conductive member 15a of the lamp socket 11 is connected to one end of the primary coil 14a. The capacitor 133 for noise filter is connected between contacts b and c of the connector CN1. The side end portion on the low-potential side of the secondary coil 14b in the high-voltage pulse transformer 14 is connected to the contact c of the connector CN1. In the connector CN1, the contact a is shorter than the contacts b and c and is at the back of the contacts b and c.

The cable FK has connects CN2 and CN3 at both ends thereof. The connector CN2 is connected to the connector CN1 of the oscillating circuit-for-driving 13. The connector CN3 has contacts d, e, and f, and is connected to a connector CN4 of the stabilizer 12 which will be described later. The contact d is at the back of the contacts e and f.

The stabilizer 12 comprises: a voltage increasing circuit 121; a DC/AC converting circuit 122; a high-voltage power supply 123; and the connector CN4. The voltage increasing circuit 121 converts a voltage from the DC power supply 40 into a DC current having a predetermined increased voltage, comprises a voltage increasing chopper circuit. An input terminal of the stabilizer 12 is connected to the DC power supply 40. The DC/AC converting circuit 122 converts DC current into AC current, and comprises a full-bridge inverter. An input terminal of the DC/AC converting circuit 122 is connected to an output terminal of the voltage increasing circuit 121. The high-voltage power supply 123 is a DC/DC converting circuit which inputs a switching voltage of the voltage circuit 121 and a zigzag voltage generates in the oscillating circuit-for-driving 13, comprises an oscillating circuit for contracting and stretching, supplies the generated zigzag voltage to the oscillating circuit-for-driving 13. An output voltage of the high-voltage power supply 123 is detected by the voltage increasing circuit 121. The connector CN4 forms an output terminal of the stabilizer 12 and supplies, to the ignitor circuit IG, an AC output voltage of the DC/AC converting circuit 122 and the zigzag voltage of the high-voltage power supply 123. The stabilizer 12 has a control line g and is controlled for the operation thereof by an external lighting operation switch via the control line g. Further, the stabilizer 12 comprises a signal line h which outputs an output signal for alarming a connector abnormal state.

Next, a description is given of the abnormal state of the connector with reference to FIGS. 7A to 7C and 8.

FIGS. 7A to 7C show different fitting states of the connectors CN1 and CN2. FIG. 7A illustrates a normal attaching state, FIG. 7B illustrates an incomplete attaching state, and FIG. 7C illustrates an opening state. In the incomplete attaching state shown in FIG. 7B, the contact a of the connector CN1 is at the back position as mentioned above and, therefore, the connector CN1 is opened, thereby stopping the operation for supplying the zigzag voltage shown by reference numeral a in FIG. 8 which is supplied to the oscillating circuit-for-driving 13 of the ignitor circuit IG from the high-voltage power supply 123. Thus, the high-voltage lamp 20 is not lit on. In the opening state shown in FIG. 7C, the similar state exhibits. In the above abnormal state, as shown by reference numeral b shown in FIG. 8, the zigzag voltage supplied from the high-voltage power supply 123 is increased. When the zigzag voltage is over a predetermined threshold, the voltage circuit 121 outputs the output signal for alarming the connector state to the signal line h. The relationship between the CN3 and CN4 is similar to the foregoing.

Figure 9:
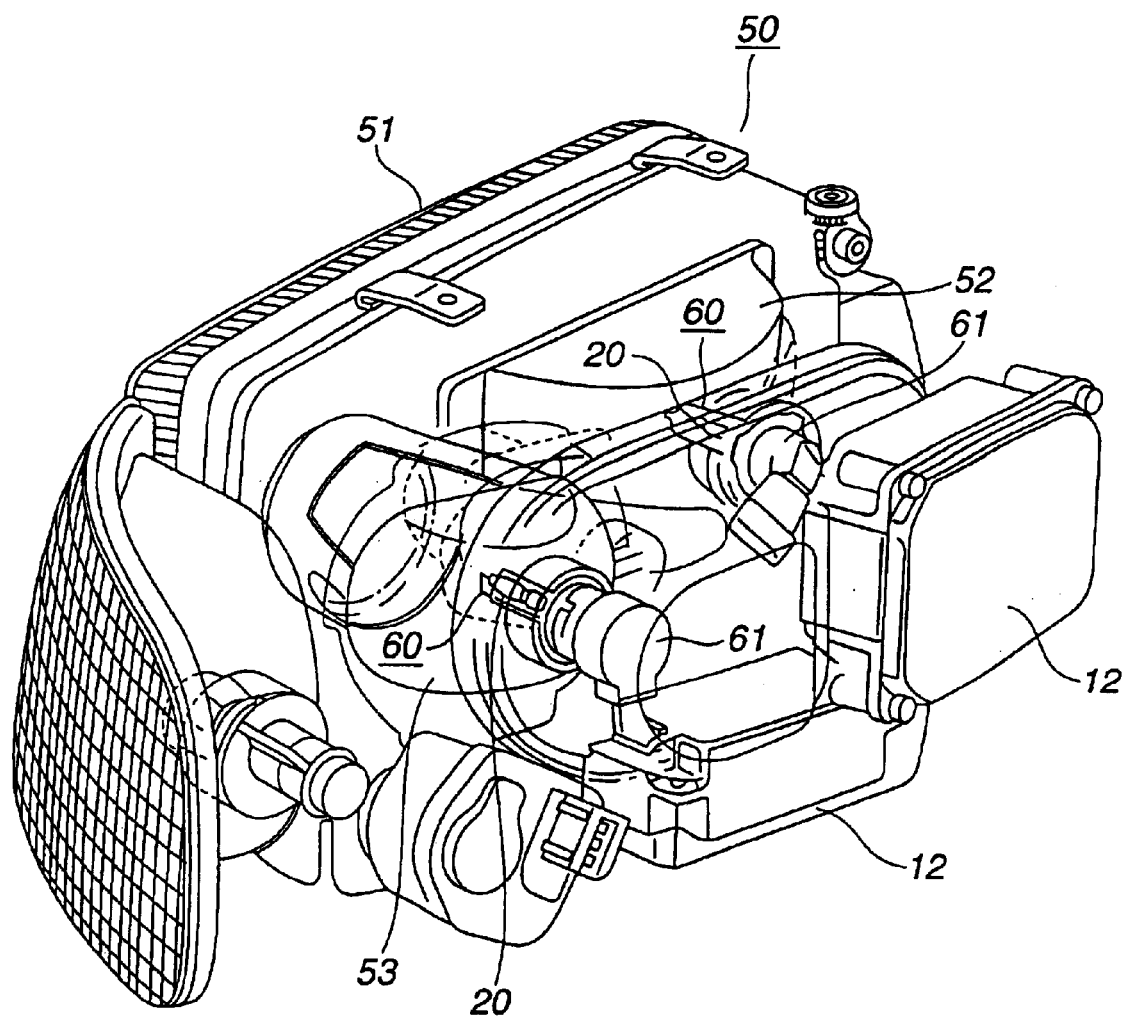
FIG. 9 is a perspective view showing a headlight apparatus for automobile to which the high-voltage discharge lamp apparatus of the present invention is applied.
Figure 10:
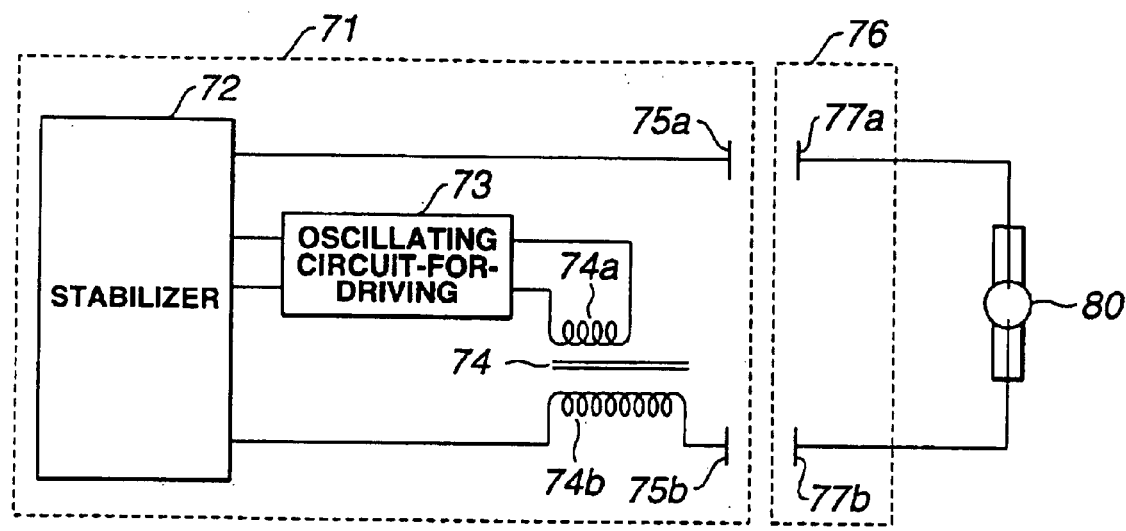
FIG. 10 is a block diagram for explaining a relationship between a cap portion and a socket portion in a conventional high-voltage discharge lamp lighting apparatus.

FIG. 9 is a perspective view showing a headlight apparatus for automobile to which the high-voltage discharge lamp apparatus of the present invention is applied. The headlight apparatus for automobile comprises a headlight main body 50 and a high-voltage discharge lamp apparatus 60 (including the stabilizer 12).

The headlight main body 50 comprises a front transmitting panel 51, and reflectors 52 and 53 etc. The transmitting panel 51 is shaped matching the outer surface of the automobile and comprises predetermined optical means such as prism. The reflectors 52 and 53 are arranged to the high-voltage discharge lamps 20 respectively so as to obtain the light-distribution property which is required respectively by the high-voltage discharge lamps 20.

The high-voltage discharge lamp apparatus 60 comprises the high-voltage discharge lamp 20 and a lamp attaching portion 61. The high-voltage discharge lamp 20 is similar to that shown in FIG. 6. The lamp attaching portion 61 comprises: the lamp socket 11, the high-voltage pulse transformer 14, and the oscillating circuit-for-driving 13, shown in FIG. 6.

The stabilizer 12 is accommodated in a metallic container and has the same inner structure as that shown in FIG. 6.

Two high-voltage discharge lamps 20 are attached to the headlight main body 50, thereby forming four headlight apparatuses. A light emitting portion in the high-voltage discharge lamp 20 is approximately at the focusing points of the reflectors 52 and 53 in the headlight main body 50.

In the headlight apparatus for automobile with the structure shown in FIG. 9, the lamp socket which accommodates the high-voltage pulse transformer shown in FIG. 4B, 5A, or 5B is used and therefore the headlight is realized with the leakage of the high-voltage energy reduced.

Although the headlight for automobile is described above as an example, obviously, the present invention can be applied to a high-voltage discharge lamp lighting apparatus, a high-voltage discharge lamp apparatus, and a floodlight projector apparatus, which are used for projecting apparatuses other than the automobile headlight.

Industrial Applicability

According to the present invention, a part of the high-voltage pulse transformer in the ignitor circuit is arranged to the cap portion in the high-voltage discharge lamp, and a part of the high-voltage pulse transformer is arranged to the socket portion. Accordingly, first, upon detaching the cap portion from the socket portion, the present invention can realize the high-voltage discharge lamp lighting apparatus, the high-voltage discharge lamp apparatus, and the floodlight projector apparatus which can prevent the occurrence of a default such as electric shock.

Secondarily, the cap portion and the socket portion are reduced in size. The attachment structure of the cap portion to the socket portion is simplified by connecting them by a small number of connecting pieces and the detaching operation upon replacing the lamp is easy. Further, the present invention can realize the high-voltage discharge lamp lighting apparatus, the high-voltage discharge lamp apparatus, and the floodlight projector apparatus, in which the replacement costs of the high-voltage discharge lamp are extremely low when replacing the high-voltage discharge lamp.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A high-voltage discharge lamp lighting apparatus comprising:

lighting means comprising a stabilizer and an ignitor circuit comprising an oscillating circuit-for-driving and a high-voltage pulse generating transformer, said stabilizer supplying a power voltage for maintaining the lighting operation to a high-voltage discharge lamp, said oscillating circuit-for-driving generating a start pulse at the time of starting the lighting operation of said high-voltage discharge lamp, said high-voltage pulse generating transformer increasing a voltage of the start pulse;

cap means which mounts and holds said high-voltage discharge lamp thereon, said cap means including a magnetic core and a secondary coil which constitute said high-voltage pulse generating transformer of said ignitor circuit; and socket means to which said cap means is fitted and attached, said socket means including at least said oscillating circuit-for-driving of said ignitor circuit and a primary coil of said high-voltage pulse generating transformer, which is a component not included in said cap means, wherein the operation for fitting and attaching said cap means to said socket means causes said high-voltage pulse generating transformer to function, said socket means has a fitting and attaching portion which is made of a cylindrical member, and two connecting pieces connected to two output terminals of said stabilizer and disposed apart from each other in the axial direction on the inner circumferential surface of the cylindrical member, and said cap means has a fitting and attaching portion which is formed of a cylindrical member capable of being fitted to the inner circumference of the cylindrical member of said socket means, and first and second contacts being capable of contacting with the two connecting pieces of said socket means and disposed in ring shapes apart from each other in the axial direction on the outer circumferential surface of the cylindrical member of said cap means, the first contact being connected to one electrode of said high-voltage discharge lamp, the second contact being connected to a terminal end extended from the other electrode of said high-voltage discharge lamp via the secondary coil of said high-voltage pulse generating transformer.

2. A high-voltage discharge lamp lighting apparatus comprising:

lighting means comprising a stabilizer and an ignitor circuit comprising an oscillating circuit-for-driving and a high-voltage pulse generating transformer, said stabilizer supplying a power voltage for maintaining the lighting operation to a high-voltage discharge lamp, said oscillating circuit-for-driving generating a start pulse at the time of starting the lighting operation of said high-voltage discharge lamp, said high-voltage pulse generating transformer increasing a voltage of the start pulse;

cap means which mounts and holds said high-voltage discharge lamp thereon, said cap means including a secondary coil which constitutes said high-voltage pulse generating transformer of said ignitor circuit; and socket means to which said cap means is fitted and attached, said socket means including at least said oscillating circuit-for-driving of said ignitor circuit and a primary coil and a magnetic core of said high-voltage pulse generating transformer, which are components not included in said cap means, wherein the operation for fitting and attaching said cap means to said socket means causes said high-voltage pulse generating transformer to function, said socket means has a fitting and attaching portion which is made of a cylindrical member, and two connecting pieces connected to two output terminals of said stabilizer and disposed apart from each other in the axial direction on the inner circumferential surface of the cylindrical member, and said cap means has a fitting and attaching portion which is formed of a cylindrical member capable of being fitted to the inner circumference of the cylindrical member of said socket means, and first and second contacts being capable of contacting with the two connecting pieces of said socket means and disposed in ring shapes apart from each other in the axial direction on the outer circumferential surface of the cylindrical member of said cap means, the first contact being connected to one electrode of said high-voltage discharge lamp, the second contact being connected to a end extended from the other electrode of said high-voltage discharge lamp via the secondary coil of said high-voltage pulse generating transformer.

3. A high-voltage discharge lamp lighting apparatus comprising:

lighting means comprising a stabilizer and an ignitor circuit comprising an oscillating circuit-for-driving and a high-voltage pulse generating transformer, said stabilizer supplying a power voltage for maintaining the lighting operation to a high-voltage discharge lamp, said oscillating circuit-for-driving generating a start pulse at the time of starting the lighting operation of said high-voltage discharge lamp, said high-voltage pulse generating transformer increasing a voltage of the start pulse;

cap means which mounts and holds said high-voltage discharge lamp thereon, said cap means including a part of a primary coil which constitutes said high-voltage pulse generating transformer of said ignitor circuit; and socket means to which said cap means is fitted and attached, said socket means including at least said oscillating circuit-for-driving of said ignitor circuit and the other part of the primary coil, a magnetic core and a secondary coil of said high-voltage pulse generating transformer, which are components not included in said cap means, wherein the operation for fitting and attaching said cap means to said socket means makes the primary coil of said high-voltage pulse generating transformer completely formed and causes said high-voltage pulse generating transformer to function, said socket means has a fitting and attaching portion which is made of a cylindrical member, two connecting pieces connected respectively to one output terminal of said stabilizer and a terminal end of the primary coil of said high-voltage pulse generating transformer and disposed apart from each other in the axial direction on the inner circumferential surface of the cylindrical member, and a high-voltage side connecting piece disposed on the inner bottom surface of the cylindrical member of said socket means and connected to a terminal end extended from the other output terminal of said stabilizer via the secondary coil of said high-voltage pulse generating transformer, and said cap means has a fitting and attaching portion which is formed of a cylindrical member capable of being fitted to the inner circumference of the cylindrical member of said socket means, a first contact being capable of contacting with the two connecting pieces of said socket means and disposed in a ring shape on the outer circumferential surface of the cylindrical member of said cap means, and a high-voltage side contact being capable of contacting with the high-voltage side connecting piece of said socket means and disposed in a projected shape on the outer bottom surface of the cylindrical member of said cap means, the first contact and the high-voltage side contact being connected respectively to opposite electrodes of said high-voltage discharge lamp.

4. A high-voltage discharge lamp lighting apparatus comprising:

lighting means comprising a stabilizer and an ignitor circuit comprising an oscillating circuit-for-driving and a high-voltage pulse generating transformer, said stabilizer supplying a power voltage for maintaining the lighting operation to a high-voltage discharge lamp, said oscillating circuit-for-driving generating a start pulse at the time of starting the lighting operation of said high-voltage discharge lamp, said high-voltage pulse generating transformer increasing a voltage of the start pulse;

cap means which mounts and holds said high-voltage discharge lamp thereon, said cap means including a magnetic core which constitutes said high-voltage pulse generating transformer of said ignitor circuit; and socket means to which said cap means is fitted and attached, said socket means including at least said oscillating circuit-for-driving of said ignitor circuit and a primary coil and a secondary coil of said high-voltage pulse generating transformer, which are components not included in said cap means, wherein the operation for fitting and attaching said cap means to said socket means causes said high-voltage pulse generating transformer to function, said socket means has a fitting and attaching portion which is made of a cylindrical member, a first connecting piece disposed on the inner circumferential surface of the cylindrical member and connected to one output terminal of said stabilizer, and a high-voltage side connecting piece disposed on the inner bottom surface of the cylindrical member of said socket means and connected to a terminal end extended from the other output terminal of said stabilizer via the secondary coil of said high-voltage pulse generating transformer, and said cap means has a fitting and attaching portion which is formed of a cylindrical member capable of being fitted to the inner circumference of the cylindrical member of said socket means, a first contact being capable of contacting with said first connecting piece of said socket means and disposed in a ring shape on the outer circumferential surface of the cylindrical member of said cap means, and a high-voltage side contact being capable of contacting with the high-voltage side connecting piece of said socket means and disposed in a projected shape on the outer bottom surface of the cylindrical member of said cap means, the first contact and the high-voltage side contact being connected respectively to opposite electrodes of said high-voltage discharge lamp.

5. A high-voltage discharge lamp lighting apparatus comprising:

lighting means comprising a stabilizer and an ignitor circuit comprising an oscillating circuit-for-driving and a high-voltage pulse generating transformer, said stabilizer supplying a power voltage for maintaining the lighting operation to a high-voltage discharge lamp, said oscillating circuit-for-driving generating a start pulse at the time of starting the lighting operation of said high-voltage discharge lamp, said high-voltage pulse generating transformer increasing a voltage of the start pulse;

cap means which mounts and holds said high-voltage discharge lamp thereon, said cap means including a part of a primary coil which constitutes said high-voltage pulse generating transformer of said ignitor circuit; and socket means to which said cap means is fitted and attached, said socket means including at least said oscillating circuit-for-driving of said ignitor circuit and the other part of the primary coil, a magnetic core and a secondary coil of said high-voltage pulse generating transformer, which are components not included in said cap means, wherein the operation for fitting and attaching said cap means to said socket means makes the primary coil of said high-voltage pulse generating transformer completely formed and causes said high-voltage pulse generating transformer to function, and said high-voltage pulse generating transformer comprises:

the magnetic core comprising a first magnetic core member having a pair of leg portions and a U-shaped cross-section, and a second magnetic core member being in a linear shape and having one end in contact with one leg portion of said first magnetic core member and the other end opposed to the other leg portion of said first magnetic core member with a gap formed therebetween;

the secondary coil wound over said second magnetic core member;

the primary coil wound over said second magnetic core member in concentric and radially outwardly spaced relation to said secondary coil; and a molding member for insulation covering which encloses said primary coil, said secondary coil, and said second magnetic core member except for one end face of said second magnetic core member, and which fills the gap formed between said first magnetic core member and said second magnetic core member.

6. A high-voltage discharge lamp lighting apparatus comprising:

lighting means comprising a stabilizer and an ignitor circuit comprising an oscillating circuit-for-driving and a high-voltage pulse generating transformer, said stabilizer supplying a power voltage for maintaining the lighting operation to a high-voltage discharge lamp, said oscillating circuit-for-driving generating a start pulse at the time of starting the lighting operation of said high-voltage discharge lamp, said high-voltage pulse generating transformer increasing a voltage of the start pulse;

cap means which mounts and holds said high-voltage discharge lamp thereon, said cap means including a part of a primary coil which constitutes said high-voltage pulse generating transformer of said ignitor circuit; and socket means to which said cap means is fitted and attached, said socket means including at least said oscillating circuit-for-driving of said ignitor circuit and the other part of the primary coil, a magnetic core and a secondary coil of said high-voltage pulse generating transformer, which are components not included in said cap means, wherein the operation for fitting and attaching said cap means to said socket means makes the primary coil of said high-voltage pulse generating transformer completely formed and causes said high-voltage pulse generating transformer to function, said socket means has a fitting and attaching portion which is made of a cylindrical member, two connecting pieces connected respectively to one output terminal of said stabilizer and a terminal end of the primary coil of said high-voltage pulse generating transformer and disposed apart from each other in the axial direction on the inner circumferential surface of the cylindrical member, and a high-voltage side connecting piece disposed on the inner bottom surface of the cylindrical member of said socket means and connected to a terminal end extended from the other output terminal of said stabilizer via the secondary coil of said high-voltage pulse generating transformer, said cap means has a fitting and attaching portion which is formed of a cylindrical member capable of being fitted to the inner circumference of the cylindrical member of said socket means, a first contact being capable of contacting with the two connecting pieces of said socket means and disposed in a ring shape on the outer circumferential surface of the cylindrical member of said cap means, and a high-voltage side contact being capable of contacting with the high-voltage side connecting piece of said socket means and disposed in a projected shape on the outer bottom surface of the cylindrical member of said cap means, the first contact and the high-voltage side contact being connected respectively to opposite electrodes of said high-voltage discharge lamp, and said high-voltage pulse generating transformer comprises:

the magnetic core comprising a first magnetic core member having a pair of leg portions and a U-shaped cross-section, and a second magnetic core member being in a linear shape and having one end in contact with one leg portion of said first magnetic core member and the other end opposed to the other leg portion of said first magnetic core member with a gap formed therebetween;

the secondary coil wound over said second magnetic core member;

the primary coil wound over said second magnetic core member in concentric and radially outwardly spaced relation to said secondary coil; and a molding member for insulation covering which encloses said primary coil, said secondary coil, and said second magnetic core member except for one end face of said second magnetic core member, and which fills the gap formed between said first magnetic core member and said second magnetic core member.

7. A high-voltage discharge lamp apparatus comprising: a high-voltage discharge lamp; and a high-voltage discharge lamp lighting apparatus comprising lighting means comprising a stabilizer and an ignitor circuit comprising an oscillating circuit-for-driving and a high-voltage pulse generating transformer, said stabilizer supplying a power voltage for maintaining the lighting operation to a high-voltage discharge lamp, said oscillating circuit-for-driving generating a start pulse at the time of starting the lighting operation of said high-voltage discharge lamp, said high-voltage pulse generating transformer increasing a voltage of the start pulse; cap means which mounts and holds said high-voltage discharge lamp thereon, said cap means including a magnetic core and a secondary coil which constitute said high-voltage pulse generating transformer of said ignitor circuit; and socket means to which said cap means is fitted and attached, said socket means including at least said oscillating circuit-for-driving of said ignitor circuit and a primary coil of said high-voltage pulse generating transformer, which is a component not included in said cap means, wherein the operation for fitting and attaching said cap means to said socket means causes said high-voltage pulse generating transformer to function, said socket means has a fitting and attaching portion which is made of a cylindrical member, and two connecting pieces connected to two output terminals of said stabilizer and disposed apart from each other in the axial direction on the inner circumferential surface of the cylindrical member, and said cap means has a fitting and attaching portion which is formed of a cylindrical member capable of being fitted to the inner circumference of the cylindrical member of said socket means, and first and second contacts being capable of contacting with the two connecting pieces of said socket means and disposed in ring shapes apart from each other in the axial direction on the outer circumferential surface of the cylindrical member of said cap means, the first contact being connected to one electrode of said high-voltage discharge lamp, the second contact being connected to a terminal end extended from the other electrode of said high-voltage discharge lamp via the secondary coil of said high-voltage pulse generating transformer.

8. A high-voltage discharge lamp apparatus comprising:
a high-voltage discharge lamp; and
a high-voltage discharge lamp lighting apparatus comprising lighting means comprising a stabilizer and an ignitor circuit comprising an oscillating circuit-for-driving and a high-voltage pulse generating transformer, said stabilizer supplying a power voltage for maintaining the lighting operation to a high-voltage discharge lamp, said oscillating circuit-for-driving generating a start pulse at the time of starting the lighting operation of said high-voltage discharge lamp, said high-voltage pulse generating transformer increasing a voltage of the start pulse; cap means which mounts and holds said high-voltage discharge lamp thereon, said cap means including a secondary coil which constitutes said high-voltage pulse generating transformer of said ignitor circuit; and socket means to which said cap means is fitted and attached, said socket means including at least said oscillating circuit-for-driving of said ignitor circuit and a primary coil and a magnetic core of said high-voltage pulse generating transformer, which are components not included in said cap means,
wherein the operation for fitting and attaching said cap means to said socket means causes said high-voltage pulse generating transformer to function,
said socket means has a fitting and attaching portion which is made of a cylindrical member, and two connecting pieces connected to two output terminals of said stabilizer and disposed apart from each other in the axial direction on the inner circumferential surface of the cylindrical member, and
said cap means has a fitting and attaching portion which is formed of a cylindrical member capable of being fitted to the inner circumference of the cylindrical, member of said socket means, and first and second contacts being capable of contacting with the two connecting pieces of said socket means and disposed in ring shapes apart from each other in the axial direction on the outer circumferential surface of the cylindrical member of said cap means, the first contact being connected to one electrode of said high-voltage discharge lamp, the second contact being connected to a terminal end extended from the other electrode of said high-voltage discharge lamp via the secondary coil of said high-voltage pulse generating transformer.

9. A high-voltage discharge lamp apparatus comprising;
a high-voltage discharge lamp; and
a high-voltage discharge lamp lighting apparatus comprising lighting means comprising a stabilizer and an ignitor circuit comprising an oscillating circuit-for-driving and a high-voltage pulse generating transformer, said stabilizer supplying a power voltage for maintaining the lighting operation to a high-voltage discharge lamp, said oscillating circuit-for-driving generating a start pulse at the time of starting the lighting operation of said high-voltage discharge lamp, said high-voltage pulse generating transformer increasing a voltage of the start pulse; cap means which mounts and holds said high-voltage discharge lamp thereon, said cap means including a part of a primary coil which constitutes said high-voltage pulse generating transformer of said ignitor circuit; and socket means to which said cap means is fitted and attached, said socket means including at least said oscillating circuit-for-driving of said ignitor circuit and the other part of the primary coil, a magnetic core and a secondary coil of said high-voltage pulse generating transformer, which are components not included in said cap means,
wherein the operation for fitting and attaching said cap means to said socket means makes the primary coil of said high-voltage pulse generating transformer completely formed and causes said high-voltage pulse generating transformer to function,
said socket means has a fitting and attaching portion which is made of a cylindrical member, two connecting pieces connected respectively to one output terminal of said stabilizer and a terminal end of the primary coil of said high-voltage pulse generating transformer and disposed apart from each other in the axial direction on the inner circumferential surface of the cylindrical member, and a high-voltage side connecting piece disposed on the inner bottom surface of the cylindrical member of said socket means and connected to a terminal end extended from the other output terminal of said stabilizer via the secondary coil of said high-voltage pulse generating transformer, and
said cap means has a fitting and attaching portion which is formed of a cylindrical member capable of being fitted to the inner circumference of the cylindrical member of said socket means, a first contact being capable of contacting with the two connecting pieces of said socket means and disposed in a ring shape on the outer circumferential surface of the cylindrical member of said cap means, and a high-voltage side contact being capable of contacting with the high-voltage side connecting piece of said socket means and disposed in a projected shape on the outer bottom surface of the cylindrical member of said cap means, the first contact and the high-voltage side contact being connected respectively to opposite electrodes of said high-voltage discharge lamp.

10. A high-voltage discharge lamp apparatus comprising:
a high-voltage discharge lamp; and
a high-voltage discharge lamp lighting apparatus comprising lighting means comprising a stabilizer and an ignitor circuit comprising an oscillating circuit-for-driving and a high-voltage pulse generating transformer, said stabilizer supplying a power voltage for maintaining the lighting operation to a high-voltage discharge lamp, said oscillating circuit-for-driving generating a start pulse at the time of starting the lighting operation of said high-voltage discharge lamp, said high-voltage pulse generating transformer increasing a voltage of the start pulse; cap means which mounts and holds said high-voltage discharge lamp thereon, said cap means including a magnetic core which constitutes said high-voltage pulse generating transformer of said ignitor circuit; and socket means to which said cap means is fitted and attached, said socket means including at least said oscillating circuit-for-driving of said ignitor circuit and a primary coil and a secondary coil of said high-voltage pulse generating transformer, which are components not included in said cap means,
wherein the operation for fitting and attaching said cap means to said socket means causes said high-voltage pulse generating transformer to function,
said socket means has a fitting and attaching portion which is made of a cylindrical member, a first connecting piece disposed on the inner circumferential surface of the cylindrical member and connected to one output terminal of said stabilizer, and a high-voltage side connecting piece disposed on the inner bottom surface of the cylindrical member of said socket means and connected to a terminal end extended from the other output terminal of said stabilizer via the secondary coil of said high-voltage pulse generating transformer, and said cap means has a fitting and attaching portion which is formed of a cylindrical member capable of being fitted to the inner circumference of the cylindrical member of said socket means, a first contact being capable of contacting with said first connecting piece of said socket means and disposed in a ring shape on the outer circumferential surface of the cylindrical member of said cap means, and a high-voltage side contact being capable of contacting with the high-voltage side connecting piece of said socket means and disposed in a projected shape on the outer bottom surface of the cylindrical member of said cap means, the first contact and the high-voltage side contact being connected respectively to opposite electrodes of said high-voltage discharge lamp.

11. A high-voltage discharge lamp apparatus comprising:

a high-voltage discharge lamp; and a high-voltage discharge lamp lighting apparatus comprising lighting means comprising a stabilizer and an ignitor circuit comprising an oscillating circuit-for-driving and a high-voltage pulse generating transformer, said stabilizer supplying a power voltage for maintaining the lighting operation to a high-voltage discharge lamp, said oscillating circuit-for-driving generating a start pulse at the time of starting the lighting operation of said high-voltage discharge lamp, said high-voltage pulse generating transformer increasing a voltage of the start pulse; cap means which mounts and holds said high-voltage discharge lamp thereon, said cap means including a part of a primary coil which constitutes said high-voltage pulse generating transformer of said ignitor circuit; and socket means to which said cap means is fitted and attached, said socket means including at least said oscillating circuit-for-driving of said ignitor circuit and the other part of the primary coil, a magnetic core and a secondary coil of said high-voltage pulse generating transformer, which are components not included in said cap means, wherein the operation for fitting and attaching said cap means to said socket means makes the primary coil of said high-voltage pulse generating transformer completely formed and causes said high-voltage pulse generating transformer to function, and said high-voltage pulse generating transformer comprises:

the magnetic core comprising a first magnetic core member having a pair of leg portions and a U-shaped cross-section, and a second magnetic core member being in a linear shape and having one end in contact with one leg portion of said first magnetic core member and the other end opposed to the other leg portion of said first magnetic core member with a gap formed therebetween;

the secondary coil wound over said second magnetic core member;

the primary coil wound over said second magnetic core member in concentric and radially outwardly spaced relation to said secondary coil; and a molding member for insulation covering which encloses said primary coil, said secondary coil, and said second magnetic core member except for one end face of said second magnetic core member, and which fills the gap formed between said first magnetic core member and said second magnetic core member.

12. A high-voltage discharge lamp apparatus comprising:

a high-voltage discharge lamp; and a high-voltage discharge lamp lighting apparatus comprising lighting means comprising a stabilizer and an ignitor circuit comprising an oscillating circuit-for-driving and a high-voltage pulse generating transformer, said stabilizer supplying a power voltage for maintaining the lighting operation to a high-voltage discharge lamp, said oscillating circuit-for-driving generating a start pulse at the time of starting the lighting operation of said high-voltage discharge lamp, said high-voltage pulse generating transformer increasing a voltage of the start pulse; cap means which mounts and holds said high-voltage discharge lamp thereon, said cap means including a part of a primary coil which constitutes said high-voltage pulse generating transformer of said ignitor circuit; and socket means to which said cap means is fitted and attached, said socket means including at least said oscillating circuit-for-driving of said ignitor circuit and the other part of the primary coil, a magnetic core and a secondary coil of said high-voltage pulse generating transformer, which are components not included in said cap means, wherein the operation for fitting and attaching said cap means to said socket means makes the primary coil of said high-voltage pulse generating transformer completely formed and causes said high-voltage pulse generating transformer to function, said socket means has a fitting and attaching portion which is made of a cylindrical member, two connecting pieces connected respectively to one output terminal of said stabilizer and a terminal end of the primary coil of said high-voltage pulse generating transformer and disposed apart from each other in the axial direction on the inner circumferential surface of the cylindrical member, and a high-voltage side connecting piece disposed on the inner bottom surface of the cylindrical member of said socket means and connected to a terminal end extended from the other output terminal of said stabilizer via the secondary coil of said high-voltage pulse generating transformer, said cap means has a fitting and attaching portion which is formed of a cylindrical member capable of being fitted to the inner circumference of the cylindrical member of said socket means, a first contact being capable of contacting with the two connecting pieces of said socket means and disposed in a ring shape on the outer circumferential surface of the cylindrical member of said cap means, and a high-voltage side contact being capable of contacting with the high-voltage side connecting piece of said socket means and disposed in a projected shape on the outer bottom surface of the cylindrical member of said cap means, the first contact and the high-voltage side contact being connected respectively to opposite electrodes of said high-voltage discharge lamp, and said high-voltage pulse generating transformer comprises:

the magnetic core comprising a first magnetic core member having a pair of leg portions and a U-shaped cross-section, and a second magnetic core member being in a linear shape and having one end in contact with one leg portion of said first magnetic core member and the other end opposed to the other leg portion of said first magnetic core member with a gap formed therebetween;

the secondary coil wound over said second magnetic core member;

the primary coil wound over said second magnetic core member in concentric and radially outwardly spaced relation to said secondary coil; and a molding member for insulation covering which encloses said primary coil, said secondary coil, and said second magnetic core member except for one end face of said second magnetic core member, and which fills the gap formed between said first magnetic core member and said second magnetic core member.

13. A floodlight projector apparatus comprising:

a high-voltage discharge lamp; and a high-voltage discharge lamp lighting apparatus comprising lighting means comprising a stabilizer and an ignitor circuit comprising an oscillating circuit-for-driving and a high-voltage pulse generating transformer, said stabilizer supplying a power voltage for maintaining the lighting operation to a high-voltage discharge lamp, said oscillating circuit-for-driving generating a start pulse at the time of starting the lighting operation of said high-voltage discharge lamp, said high-voltage pulse generating transformer increasing a voltage of the start pulse; cap means which mounts and holds said high-voltage discharge lamp thereon, said cap means including a magnetic core and a secondary coil which constitute said high-voltage pulse generating transformer of said ignitor circuit; and socket means to which said cap means is fitted and attached, said socket means including at least said oscillating circuit-for-driving of said ignitor circuit and a primary coil of said high-voltage pulse generating transformer, which is a component not included in said cap means, wherein the operation for fitting and attaching said cap means to said socket means causes said high-voltage pulse generating transformer to function, said socket means has a fitting and attaching portion which is made of a cylindrical member, and two connecting pieces connected to two output terminals of said stabilizer and disposed apart from each other in the axial direction on the inner circumferential surface of the cylindrical member, and said cap means has a fitting and attaching portion which is formed of a cylindrical member capable of being fitted to the inner circumference of the cylindrical member of said socket means, and first and second contacts being capable of contacting with the two connecting pieces of said socket means and disposed in ring shapes apart from each other in the axial direction on the outer circumferential surface of the cylindrical member of said cap means, the first contact being connected to one electrode of said high-voltage discharge lamp, the second contact being connected to a terminal end extended from the other electrode of said high-voltage discharge lamp via the secondary coil of said high-voltage pulse generating transformer.

14. A floodlight projector apparatus comprising:

a high-voltage discharge lamp; and a high-voltage discharge lamp lighting apparatus comprising lighting means comprising a stabilizer and an ignitor circuit comprising an oscillating circuit-for-driving and a high-voltage pulse generating transformer, said stabilizer supplying a power voltage for maintaining the lighting operation to a high-voltage discharge lamp, said oscillating circuit-for-driving generating a start pulse at the time of starting the lighting operation of said high-voltage discharge lamp, said high-voltage pulse generating transformer increasing a voltage of the start pulse; cap means which mounts and holds said high-voltage discharge lamp thereon, said cap means including a secondary coil which constitutes said high-voltage pulse generating transformer of said ignitor circuit; and socket means to which said cap means is fitted and attached, said socket means including at least said oscillating circuit-for-driving of said ignitor circuit and a primary coil and a magnetic core of said high-voltage pulse generating transformer, which are components not included in said cap means, wherein the operation for fitting and attaching said cap means to said socket means causes said high-voltage pulse generating transformer to function, said socket means has a fitting and attaching portion which is made of a cylindrical member, and two connecting pieces connected to two output terminals of said stabilizer and disposed apart from each other in the axial direction on the inner circumferential surface of the cylindrical member, and said cap means has a fitting and attaching portion which is formed of a cylindrical member capable of being fitted to the inner circumference of the cylindrical member of said socket means, and first and second contacts being capable of contacting with the two connecting pieces of said socket means and disposed in ring shapes apart from each other in the axial direction on the outer circumferential surface of the cylindrical member of said cap means, the first contact being connected to one electrode of said high-voltage discharge lamp, the second contact being connected to a terminal end extended from the other electrode of said high-voltage discharge lamp via the secondary coil of said high-voltage pulse generating transformer.

15. A floodlight projector apparatus comprising:

a high-voltage discharge lamp; and a high-voltage discharge lamp lighting apparatus comprising lighting means comprising a stabilizer and an ignitor circuit comprising an oscillating circuit-for-driving and a high-voltage pulse generating transformer, said stabilizer supplying a power voltage for maintaining the lighting operation to a high-voltage discharge lamp, said oscillating circuit-for-driving generating a start pulse at the time of starting the lighting operation of said high-voltage discharge lamp, said high-voltage pulse generating transformer increasing a voltage of the start pulse; cap means which mounts and holds said high-voltage discharge lamp thereon, said cap means including a part of a primary coil which constitutes said high-voltage pulse generating transformer of said ignitor circuit; and socket means to which said cap means is fitted and attached, said socket means including at least said oscillating circuit-for-driving of said ignitor circuit and the other part of the primary coil, a magnetic core and a secondary coil of said high-voltage pulse generating transformer, which are components not included in said cap means, wherein the operation for fitting and attaching said cap means to said socket means makes the primary coil of said high-voltage pulse generating transformer completely formed and causes said high-voltage pulse generating transformer to function, said socket means has a fitting and attaching portion which is made of a cylindrical member, two connecting pieces connected respectively to one output terminal of said stabilizer and a terminal end of the primary coil of said high-voltage pulse generating transformer and disposed apart from each other in the axial direction on the inner circumferential surface of the cylindrical member, and a high-voltage side connecting piece disposed on the inner bottom surface of the cylindrical member of said socket means and connected to a terminal end extended from the other output terminal of said stabilizer via the secondary coil of said high-voltage pulse generating transformer, and said cap means has a fitting and attaching portion which is formed of a cylindrical member capable of being fitted to the inner circumference of the cylindrical member of said socket means, a first contact being capable of contacting with the two connecting pieces of said socket means and disposed in a ring shape on the outer circumferential surface of the cylindrical member of said cap means, and a high-voltage side contact being capable of contacting with the high-voltage side connecting piece of said socket means and disposed in a projected shape on the outer bottom surface of the cylindrical member of said cap means, the first contact and the high-voltage side contact being connected respectively to opposite electrodes of said high-voltage discharge lamp.

16. A floodlight projector apparatus comprising:

a high-voltage discharge lamp; and a high-voltage discharge lamp lighting apparatus comprising lighting means comprising a stabilizer and an ignitor circuit comprising an oscillating circuit-for-driving and a high-voltage pulse generating transformer, said stabilizer supplying a power voltage for maintaining the lighting operation to a high-voltage discharge lamp, said oscillating circuit-for-driving generating a start pulse at the time of starting the lighting operation of said high-voltage discharge lamp, said high-voltage pulse generating transformer increasing a voltage of the start pulse; cap means which mounts and holds said high-voltage discharge lamp thereon, said cap means including a magnetic core which constitutes said high-voltage pulse generating transformer of said ignitor circuit; and socket means to which said cap means is fitted and attached, said socket means including at least said oscillating circuit-for-driving of said ignitor circuit and a primary coil and a secondary coil of said high-voltage pulse generating transformer, which are components not included in said cap means, wherein the operation for fitting and attaching said cap means to said socket means causes said high-voltage pulse generating transformer to function, said socket means has a fitting and attaching portion which is made of a cylindrical member, a first connecting piece disposed on the inner circumferential surface of the cylindrical member and connected to one output terminal of said stabilizer, and a high-voltage side connecting piece disposed on the inner bottom surface of the cylindrical member of said socket means and connected to a terminal end extended from the other output terminal of said stabilizer via the secondary coil of said high-voltage pulse generating transformer, and said cap means has a fitting and attaching portion which is formed of a cylindrical member capable of being fitted to the inner circumference of the cylindrical member of said socket means, a first contact being capable of contacting with said first connecting piece of said socket means and disposed in a rang shape on the outer circumferential surface of the cylindrical member of said cap means, and a high-voltage side contact being capable of contacting with the high-voltage side connecting piece of said socket means and disposed in a projected shape on the outer bottom surface of the cylindrical member of said cap means, the first contact and the high-voltage side contact being connected respectively to opposite electrodes of said high-voltage discharge lamp.

17. A floodlight projector apparatus comprising:

a high-voltage discharge lamp; and a high-voltage discharge lamp lighting apparatus comprising lighting means comprising a stabilizer and an ignitor circuit comprising an oscillating circuit-for-driving and a high-voltage pulse generating transformer, said stabilizer supplying a power voltage for maintaining the lighting operation to a high-voltage discharge lamp, said oscillating circuit-for-driving generating a start pulse at the time of starting the lighting operation of said high-voltage discharge lamp, said high-voltage pulse generating transformer increasing a voltage of the start pulse; cap means which mounts and holds said high-voltage discharge lamp thereon, said cap means including a part of a primary coil which constitutes said high-voltage pulse generating transformer of said ignitor circuit; and socket means to which said cap means is fitted and attached, said socket means including at least said oscillating circuit-for-driving of said ignitor circuit and the other part of the primary coil, a magnetic core and a secondary coil of said high-voltage pulse generating transformer, which are components not included in said cap means, wherein the operation for fitting and attaching said cap means to said socket means makes the primary coil of said high-voltage pulse generating transformer completely formed and causes said high-voltage pulse generating transformer to function, and said high-voltage pulse generating transformer comprises:

the magnetic core comprising a first magnetic core member having a pair of leg portions and a U-shaped cross-section, and a second magnetic core member being in a linear shape and having one end in contact with one leg portion of said first magnetic core member and the other end opposed to the other leg portion of said first magnetic core member with a gap formed therebetween;

the secondary coil wound over said second magnetic core member;

the primary coil wound over said second magnetic core member in concentric and radially outwardly spaced relation to said secondary coil; and a molding member for insulation covering which encloses said primary coil, said secondary coil, and said second magnetic core member except for one end face of said second magnetic core member, and which fills the gap formed between said first magnetic core member and said second magnetic core member.

18. A floodlight projector apparatus comprising:

a high-voltage discharge lamp; and a high-voltage discharge lamp lighting apparatus comprising lighting means comprising a stabilizer and an ignitor circuit comprising an oscillating circuit-for-driving and a high-voltage pulse generating transformer, said stabilizer supplying a power voltage for maintaining the lighting operation to a high-voltage discharge lamp, said oscillating circuit-for-driving generating a start pulse at the time of starting the lighting operation of said high-voltage discharge lamp, said high-voltage pulse generating transformer increasing a voltage of the start pulse; cap means which mounts and holds said high-voltage discharge lamp thereon, said cap means including a part of a primary coil which constitutes said high-voltage pulse generating transformer of said ignitor circuit; and socket means to which said cap means is fitted and attached, said socket means including at least said oscillating circuit-for-driving of said ignitor circuit and the other part of the primary coil, a magnetic core and a secondary coil of said high-voltage pulse generating transformer, which are components not included in said cap means, wherein the operation for fitting and attaching said cap means to said socket means makes the primary coil of said high-voltage pulse generating transformer completely formed and causes said high-voltage pulse generating transformer to function, said socket means has a fitting and attaching portion which is made of a cylindrical member, two connecting pieces connected respectively to one output terminal of said stabilizer and a terminal end of the primary coil of said high-voltage pulse generating transformer and disposed apart from each other in the axial direction on the inner circumferential surface of the cylindrical member, and a high-voltage side connecting piece disposed on the inner bottom surface of the cylindrical member of said socket means and connected to a terminal end extended from the other output terminal of said stabilizer via the secondary coil of said high-voltage pulse generating transformer, said cap means has a fitting and attaching portion which is formed of a cylindrical member capable of being fitted to the inner circumference of the cylindrical member of said socket means, a first contact being capable of contacting with the two connecting pieces of said socket means and disposed in a ring shape on the outer circumferential surface of the cylindrical member of said cap means, and a high-voltage side contact being capable of contacting with the high-voltage side connecting piece of said socket means and disposed in a projected shape on the outer bottom surface of the cylindrical member of said cap means, the first contact and the high-voltage side contact being connected respectively to opposite electrodes of said high-voltage discharge lamp, and said high-voltage pulse generating transformer comprises:

the magnetic core comprising a first magnetic core member having a pair of leg portions and a U-shaped cross-section, and a second magnetic core member being in a linear shape and having one end in contact with one leg portion of said first magnetic core member and the other end opposed to the other leg portion of said first magnetic core member with a gap formed therebetween:

the secondary coil wound over said second magnetic core member;

the primary coil wound over said second magnetic core member in concentric and radially outwardly spaced relation to said secondary coil; and a molding member for insulation cornering which encloses said primary coil, said secondary coil, and said second magnetic core member except for one end face of said second magnetic core member, and which fills the gap formed between said first magnetic core member and said second magnetic core member.

* * * * *